United States Patent
Itoh

(10) Patent No.: US 8,559,051 B2
(45) Date of Patent: Oct. 15, 2013

(54) IMAGE PROCESSING APPARATUS, CONTROL METHOD, AND PROGRAM PRODUCT NOTIFYING CONTROLLER OF TENTATIVE AND DETECTED DOCUMENT SIZE CONVEYED IN READER

(75) Inventor: Jun Itoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 13/242,171

(22) Filed: Sep. 23, 2011

(65) Prior Publication Data
US 2012/0081759 A1 Apr. 5, 2012

(30) Foreign Application Priority Data

Oct. 1, 2010 (JP) .................................. 2010-223820

(51) Int. Cl.
*H04N 1/393* (2006.01)
*H04N 1/00* (2006.01)
*H04N 1/21* (2006.01)

(52) U.S. Cl.
CPC ......... *H04N 1/0057* (2013.01); *H04N 1/00708* (2013.01); *H04N 1/00774* (2013.01)
USPC .......... 358/1.2; 358/1.13; 358/1.16; 358/449; 358/451

(58) Field of Classification Search
USPC ............... 358/1.2, 1.13, 1.15–1.17, 524, 528, 358/444, 449, 451; 382/298, 312; 399/17, 399/86, 370, 376
See application file for complete search history.

(56) References Cited

U.S. PATENT DOCUMENTS

| | | | | |
|---|---|---|---|---|
| 5,150,224 A | * | 9/1992 | Mizude et al. | 358/449 |
| 5,237,379 A | * | 8/1993 | Sklut et al. | 399/86 |
| 5,349,422 A | * | 9/1994 | Ohashi | 399/86 |
| 5,500,725 A | * | 3/1996 | Takasu et al. | 358/449 |
| 6,701,124 B2 | * | 3/2004 | Sakai et al. | 399/370 |
| 7,197,272 B2 | * | 3/2007 | Suzuki | 399/370 |
| 8,286,965 B2 | * | 10/2012 | Tamaoki | 399/370 |
| 8,411,322 B2 | * | 4/2013 | Kubota | 358/449 |
| 8,427,720 B2 | * | 4/2013 | Kobayashi | 358/488 |
| 2005/0095045 A1 | * | 5/2005 | Suzuki | 399/376 |
| 2013/0016366 A1 | * | 1/2013 | Sawada et al. | 358/1.2 |
| 2013/0044339 A1 | * | 2/2013 | Takahashi | 358/1.13 |

FOREIGN PATENT DOCUMENTS

JP 2004-104187 A 4/2004
JP 2009260601 A * 11/2009

* cited by examiner

*Primary Examiner* — Scott A Rogers
(74) *Attorney, Agent, or Firm* — Canon USA Inc. IP Division

(57) ABSTRACT

By using a memory capable of storing image data of a document size smaller than a maximum document size, images on both sides of a document of the maximum document size can be simultaneously read.

5 Claims, 14 Drawing Sheets

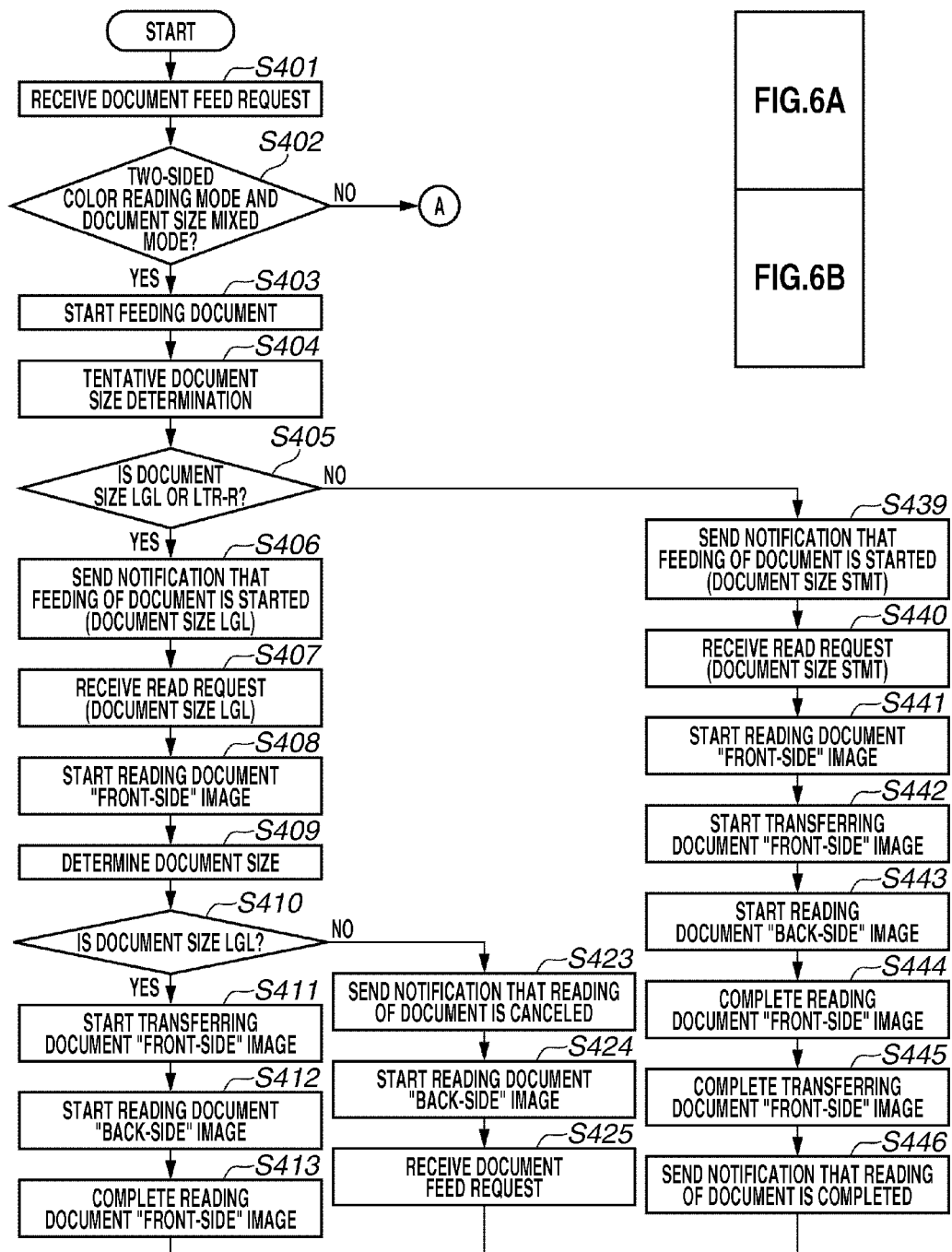
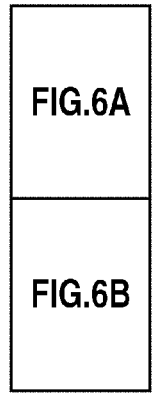
FIG.6A
FIG.6

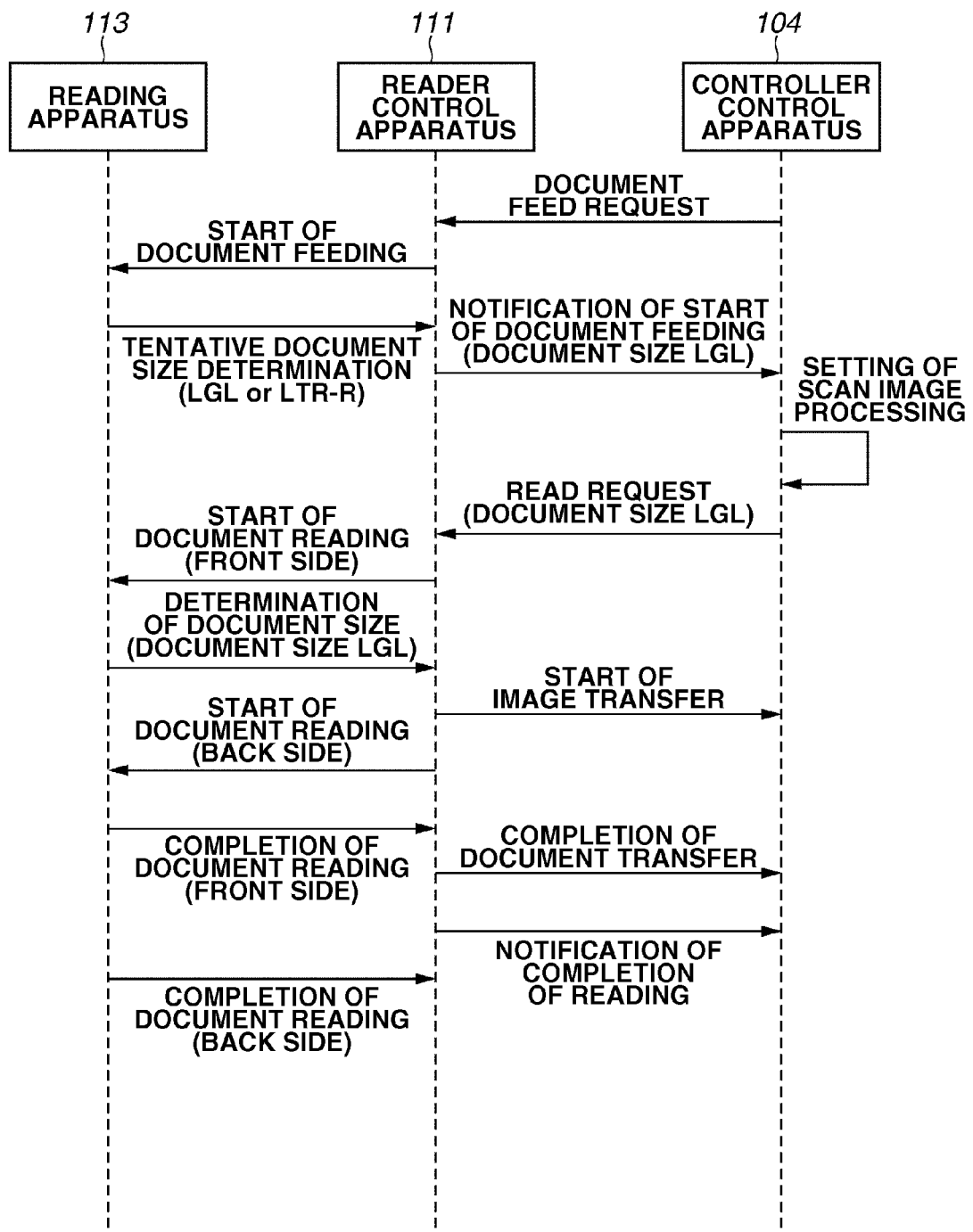

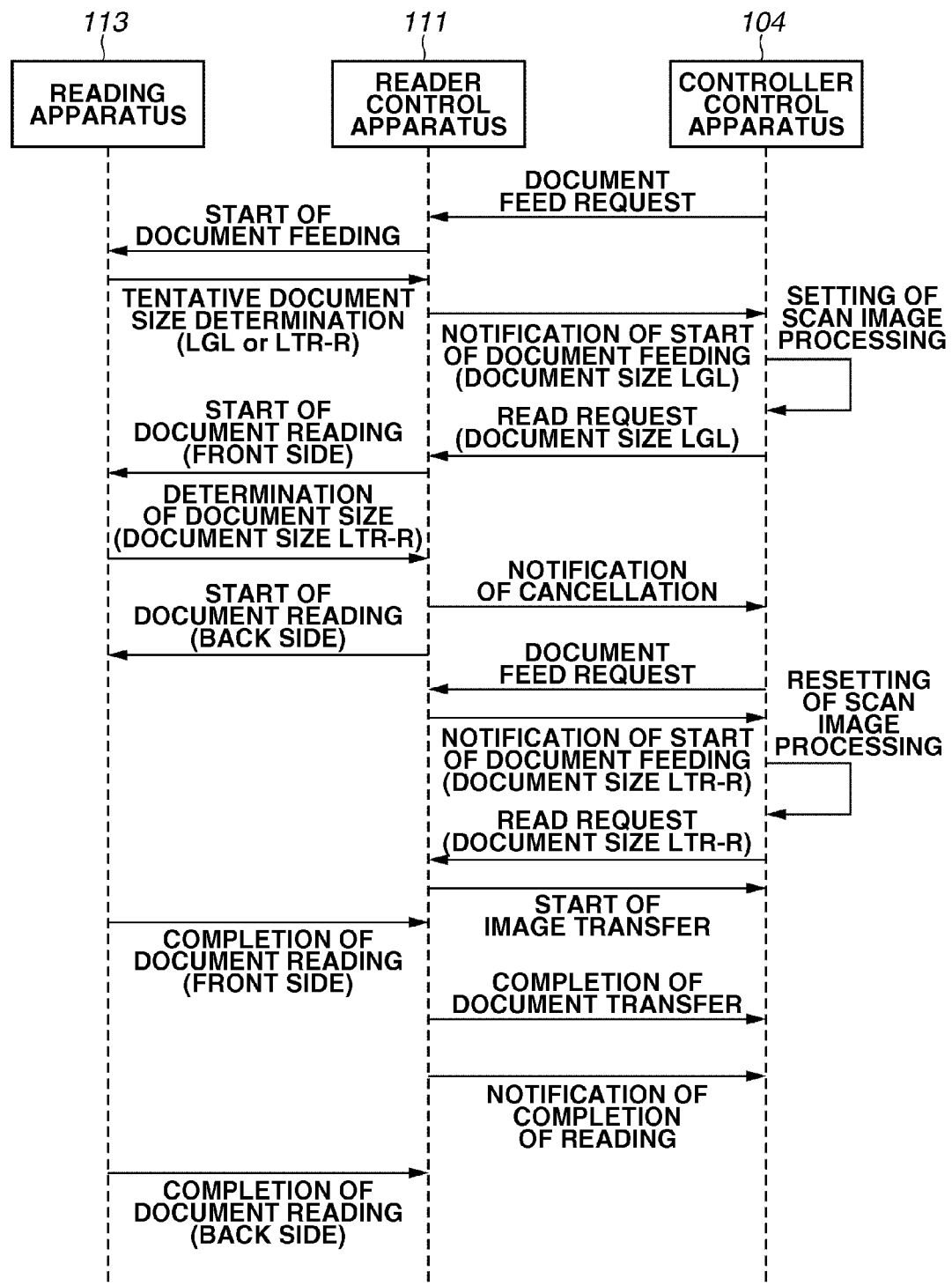

IMAGE PROCESSING APPARATUS, CONTROL METHOD, AND PROGRAM PRODUCT NOTIFYING CONTROLLER OF TENTATIVE AND DETECTED DOCUMENT SIZE CONVEYED IN READER

BACKGROUND OF THE INVENTION

1. Field of the Invention

The present invention relates to an image processing apparatus, a control method of an image processing apparatus, and a storage medium.

2. Description of the Related Art

A Document reading apparatus in digital copying machines uses a charge-coupled device (CCD) image sensor or a complementary metal oxide semiconductor (CMOS) image sensor. In the reading apparatus uses a CCD or a CMOS to read image data, the reading apparatus includes following configurations to realize a magnification function of enlarging/reducing read images.

More specifically, the magnification in the main-scanning direction is changed by executing arithmetic processing on a digital signal, and the magnification in the sub-scanning direction is changed by changing the reading speed and changing the number of read lines.

Alternatively, to change a magnification, a control unit in a reading apparatus or a main body executes arithmetic processing (image processing) on image data. In addition, many digital copying machines include a reading apparatus including an automatic document feeder (ADF). The ADF has a mechanism of automatically feeding documents placed on a document stacking tray one by one to the reading apparatus, so that the reading apparatus can read the fed documents one by one.

A document fed by such an ADF can be read in a document fixed-reading mode or in a document feeding-reading mode. In the former case, first, a document is fed onto the contact glass, and next, an image of the fed document is read by movement of a scanner unit. In the latter case, the image of a document is read while the ADF is feeding the document.

Unlike in the document fixed-reading mode, the scanner does not need to move to read every single document in the document feeding-reading mode. Thus, the document feeding-reading mode requires less time to read the entire document stack, and therefore the size of the ADF can be reduced.

In addition, a function of the digital copying machine includes an automatic magnification function to calculate a magnification ratio based on a document size and an output sheet size and to form an image. This automatic magnification function calculates an optimum magnification ratio for a read image, based on a document size automatically detected by a document size detection function included in the reader apparatus and based on an output sheet size selected by a user. The automatic magnification function then processes the image with the calculated magnification ratio.

To realize this automatic magnification function, before the document is read, the document size needs to be detected and the magnification ratio needs to be determined. In one method of detecting the document size, sensors arranged on the document stacking tray are used.

The size in a direction perpendicular to the document conveyance direction can be detected by causing a sensor to read the width of a guiding member defining the width of the top and bottom parts of a document on the document stacking tray. In another example, the size can be detected by a plurality of sensors arranged in the document conveyance direction.

In one method of detecting the length of a document in the conveyance direction, the length is detected based on a combination of timings when the document passes through a sensor arranged on the document stacking tray. In another method of detecting the length of a document, a detection sensor is arranged along the document conveyance path, and the document position or the time required from when the document leading edge passes through the detection sensor to when the document trailing edge passes through the document sensor is detected by the detection sensor.

As a problem with the former method, in a document size mixed mode where documents of different sizes are collectively set and read, regarding the size in the conveyance direction, a document size having a length smaller than a maximum length among the set documents cannot be detected on the document platen. Thus, the digital copying machine with such a document size mixed mode uses a combination of the former and latter methods to detect the document size.

However, in the document size mixed mode based on the latter method, the document size is determined only when a single document is removed and conveyed from a document stack on the document stacking tray and the document is completely separated from the other sheets.

Thus, a document conveyance path allowing this operation needs to be ensured. This size detection is possible in the case of the document fixed-reading mode where a document is fed onto the contact glass and an image of the fed document is read by the movement of a scanner. To realize the same operation in the document feeding-reading mode, since the document conveyance path needs to be ensured, the size of the ADF needs to be increased, which is undesirable In one method of ensuring the document conveyance path, a document inversion mechanism to read a two-sided document is used. This method includes a step of detecting the document size without reading the document. After the document size is determined in this step, the document is conveyed to the document reading position again to be read.

However, based on this method, the document needs to be conveyed a plurality of times along the document conveyance path for two sides, resulting in a significant decrease in productivity of the copying process. In addition, a reading apparatus having a two-sided simultaneous reading mechanism that can read both front and back sides of a document in a single document conveyance pass cannot adopt this method.

As a conventional technique, Japanese Patent Laid-Open No. 2004-104187 discusses a method to solve this problem. Based on this method, when the document size is not determined before image reading, read image data is stored in a memory, and after the document size is detected and determined, magnification is executed by image processing (arithmetic processing).

Based on the technique discussed in Japanese Patent Laid-Open No. 2004-104187, read image data needs to be stored in a memory until the document size is determined. Thus, the reading apparatus needs to have a large memory capacity.

In particular, since a reading apparatus having a two-sided simultaneous reading mechanism executes magnification processing on the back side after completion of magnification processing on the front side, the reading apparatus needs a memory capable of storing both front- and back-side data. Since the reading apparatus needs memory capacity corresponding to two pages of a maximum readable document size, memory costs are increased, which is undesirable.

In addition, a digital copying machine copies a document by causing a reading apparatus to read image data and to transfer the read image data to a control apparatus of a main body, causing the control apparatus to execute image processing on the image data and to transfer the processed image data to a printer apparatus, and causing the printer apparatus to print the image data. After the reading apparatus transfers image data to the control apparatus, the control apparatus executes image processing on the image data, and stores the processed image data in a memory of the control apparatus.

In particular, in digital copying machines having a control apparatus that can execute a magnification process as image processing, to realize a desired magnification process, some of the copying machines cause a reader unit and a control apparatus to execute different magnification processes.

For these digital copying machines, to execute a magnification process and other image processing, a read image size and an output image size determined based on the image size need to be determined, and setting of image processing needs to be executed in advance by using these values.

However, these image size values cannot be determined unless the document size is determined. In the document size mixed mode, setting of image processing cannot be executed before the document is read.

In addition, a certain period of time is required to execute setting of image processing in the control apparatus. Thus, if read image data is stored in a memory of the reading apparatus until the document size is determined, the read image data needs to be stored in a memory of the reader apparatus from when the document size is determined until when the control apparatus is ready to start processing the image data.

In particular, if the time required by the control apparatus to execute setting of image processing is not constant, the worst case needs to be considered. That is, a memory of the reading apparatus needs to have a memory capacity capable of storing the entire document image. In this respect, too, memory costs are increased, which is a significant problem.

SUMMARY OF THE INVENTION

According to an aspect of the present invention, an image processing apparatus including a reader and a controller is provided. The reader includes a conveying unit configured to convey a plurality of documents of different sizes; a reading unit configured to read an image of a document conveyed by the conveying unit, a detecting unit configured to detect a size of a document conveyed by the conveying unit; a notifying unit configured to notify the controller of a document size detected by the detecting unit; and a transmitting unit configured to transmit a document image read by the reading unit to the controller. The controller includes a setting unit configured to set an image magnification ratio in accordance with a document size given by the notifying unit, and a changing unit configured to change magnification of an image transmitted by the transmitting unit, in accordance with a magnification ratio set by the setting unit. Before the detecting unit detects the document size, the notifying unit notifies the controller of a tentative document size, and when the detecting unit detects the document size, the notifying unit notifies the controller of the document size detected by the detecting unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 12 is a sequence diagram illustrating a reading operation executed by the copying apparatus in a document size mixed mode.

FIG. 13 is a sequence diagram illustrating a reading operation executed by the copying apparatus in a document size mixed mode.

DESCRIPTION OF THE EMBODIMENTS

Various exemplary embodiments, features, and aspects of the invention will be described in detail below with reference to the drawings.

First, a configuration of a copying apparatus (a digital copying machine, an image processing apparatus, or the like) according to an exemplary embodiment of the present invention will be described.

Figure 4:
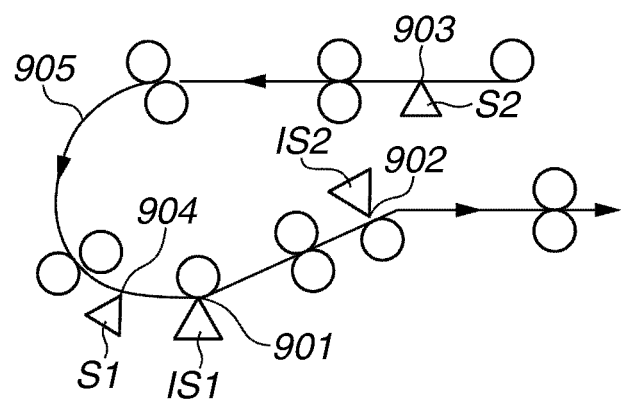
FIG. 4 illustrates a document conveyance path in the automatic document feeder.

According to the present exemplary embodiment, as illustrated in FIG. 4, a reader apparatus 102 includes an image sensor IS1 as a first reading unit that reads the front-side image of a document conveyed along a conveyance path, and an image sensor IS2 as a second reading unit that is located downstream of the image sensor IS1 and that reads the back-side image of the conveyed document.

In addition, the reader apparatus 102 includes a document detection sensor S1 as a first detection unit that detects the leading edge or the trailing edge of a document conveyed along the conveyance path, and a document detection sensor S2 as a second detection unit that is located upstream of the document detection sensor S1 and that detects the leading edge or the trailing edge of the conveyed document.

In addition, the reader apparatus 102 includes a memory 114 that can store image data read by the first and second reading units. The memory 114 can store a page of image data of a maximum document size conveyable. The document detection sensors S1 and S2 detect a conveyance state of a document conveyed along the conveyance path, and notify a reader control apparatus 111 of a conveyance state of the leading edge or the trailing edge of the document.

Figure 1:
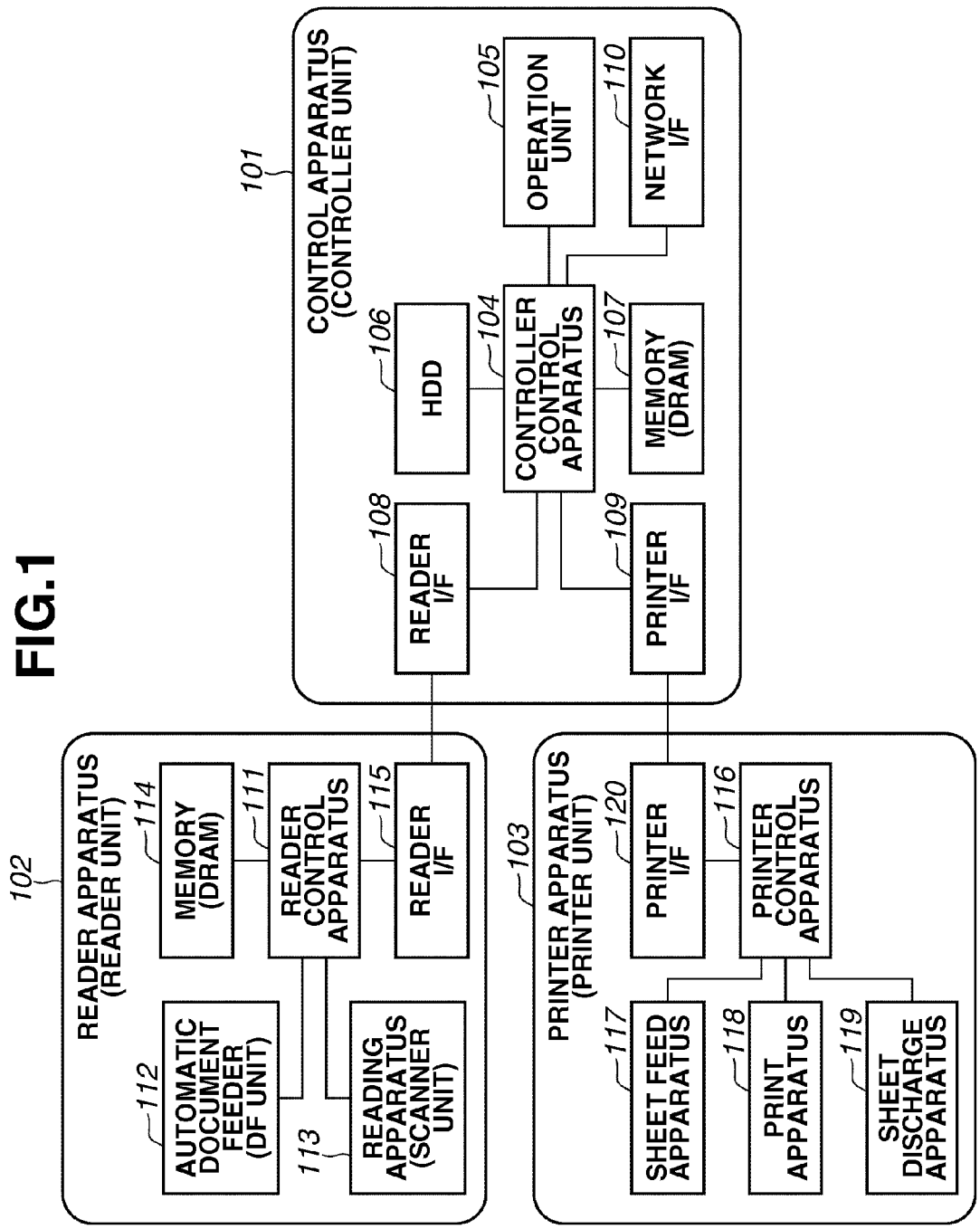
FIG. 1 is a block diagram illustrating a configuration of a copying apparatus including a reader apparatus, control apparatus, and a printer apparatus.

FIG. 1 is a block diagram illustrating an overall configuration of a copying apparatus (a digital copying machine) to which a reading apparatus according to the present exemplary embodiment is applicable.

In FIG. 1, the copying apparatus includes a control apparatus 101 controlling the entire copying apparatus, a reader apparatus 102 reading a document and creating image data, and a printer apparatus 103 printing image data on a print sheet. Reader interfaces (I/Fs) 108 and 115 connect the control apparatus 101 and the reader apparatus 102, to exchange commands relating to document reading operations and to transfer image data read by the reader apparatus 102.

Likewise, printer interfaces (I/Fs) 109 and 120 connect the control apparatus 101 and the printer apparatus 103. The reader apparatus 102 includes the reader control apparatus 111, an automatic document feeder 112, the reading apparatus 113, the memory (dynamic random access memory (DRAM)) 114, and the reader I/F 115.

The reading apparatus 113 is an image reading unit reading a document placed on a document platen. The reading apparatus 113 includes an optical scanning system including an exposure lamp, a mirror, a lens, and the like, and an image sensor such as a CCD or a CMOS reading a document image and converting the image into an electrical signal.

The automatic document feeder (DF unit) 112 is a document conveyance unit conveying a stack of documents placed on a document stacking tray one by one, and includes a sheet feed roller, a sheet discharge roller, a document detection sensor, and the like. If the reader apparatus 102 has a two-sided simultaneous document reading function, image sensors for reading each image on the front and back sides of a document are arranged along the document conveyance path in the automatic document feeder 112.

The reader control apparatus 111 is a control unit controlling the reader apparatus 102 and is connected to the automatic document feeder 112, the reading apparatus 113, the memory 114, and the reader I/F 115. The reader control apparatus 111 receives requests from the control apparatus 101 and controls the automatic document feeder 112 and the reading apparatus 113.

After executing image processing, such as color misregistration correction or luminance correction, on image data read by the automatic document feeder 112 and the reading apparatus 113, the reader control apparatus 111 transfers the image data to the control apparatus 101 via the reader I/F 115. The reader control apparatus 111 is configured to be capable of executing image processing, such as an image magnification process, on image data stored in the memory 114.

In addition, the reader control apparatus 111 stores image data read by the reading apparatus 113 and the automatic document feeder 112 in the memory 114, as needed. In response to a request from the control apparatus 101, the reader control apparatus 111 reads image data from the memory 114 and transfers the image data to the control apparatus 101. After reading image data from the memory 114, the reader control apparatus 111 can execute a magnification process as image processing.

The printer apparatus 103 includes a printer control apparatus 116, a sheet feed apparatus 117, a print apparatus 118, a sheet discharge apparatus 119, and the printer I/F 120.

The sheet feed apparatus 117 conveys print sheets from a sheet cassette to the print apparatus 118. The print apparatus 118 includes a photosensitive member on which a latent image is formed, a laser apparatus forming a latent image on a photosensitive member, an optical system including a lens, a mirror, and the like, a development apparatus forming a toner image on a photosensitive member, a fixing device transferring and fixing on a print sheet a toner image carried on a photosensitive member.

The sheet discharge apparatus 119 includes a sheet discharge tray onto which printed sheets are discharged, a sheet discharge roller conveying sheets printed by the print apparatus 118 to the sheet discharge tray, and a post-processing apparatus executing a finishing process such as stapling or punching on printed sheets.

The printer control apparatus 116 is connected to the sheet feed apparatus 117, the print apparatus 118, the paper discharge apparatus 119, and the printer I/F 120. In response to a request from the control apparatus 101, the printer control apparatus 116 transfers image data transferred from the control apparatus 101 via the printer I/F 120 to the print apparatus 118, to form an image on a print sheet.

The control apparatus 101 includes a controller control apparatus 104, an operation unit 105, a memory (DRAM) 107, a hard disk drive (HDD) 106, the reader I/F 108, the printer I/F 109, and a network I/F 110.

The operation unit 105 includes a liquid crystal touch panel display and various types of keys such as a ten key, a start key, a stop key, and a clear key. Based on a user operation, the operation unit 105 requests the control apparatus 101 to execute a process such as a copying operation.

The reader I/F 108 is connected to the reader I/F 115 of the reader apparatus 102, to exchange commands, such as a document reading request, and image data with the reader apparatus 102.

The printer I/F 109 is connected to the printer I/F 120 of the printer apparatus 103, to exchange commands, such as a print request, and to transfer a print image to the printer apparatus 103. The controller control apparatus 104 is connected to the operation unit 105, the memory 107, the HDD 106, the network I/F 110, the reader I/F 108, and the printer I/F 109.

When a user uses the operation unit 105 and enters a copying job, the control apparatus 101 sends a document read request to the reader apparatus 102. Subsequently, the control apparatus 101 receives a read image from the reader apparatus 102 and executes image processing on the received image data. Next, the controller control apparatus 104 sends a print request to the printer apparatus 103 and transfers the processed image data. In this way, the copying machine executes a document copying process.

In the present exemplary embodiment, the reader apparatus 102 includes the automatic document feeder 112 as a conveyance unit for conveying documents of different sizes. In addition, the reading apparatus 113 includes the image sensors IS1 and IS2 that can read the one-sided image and/or simultaneously two-sided images of a document conveyed by the automatic document feeder 112.

Figure 8:
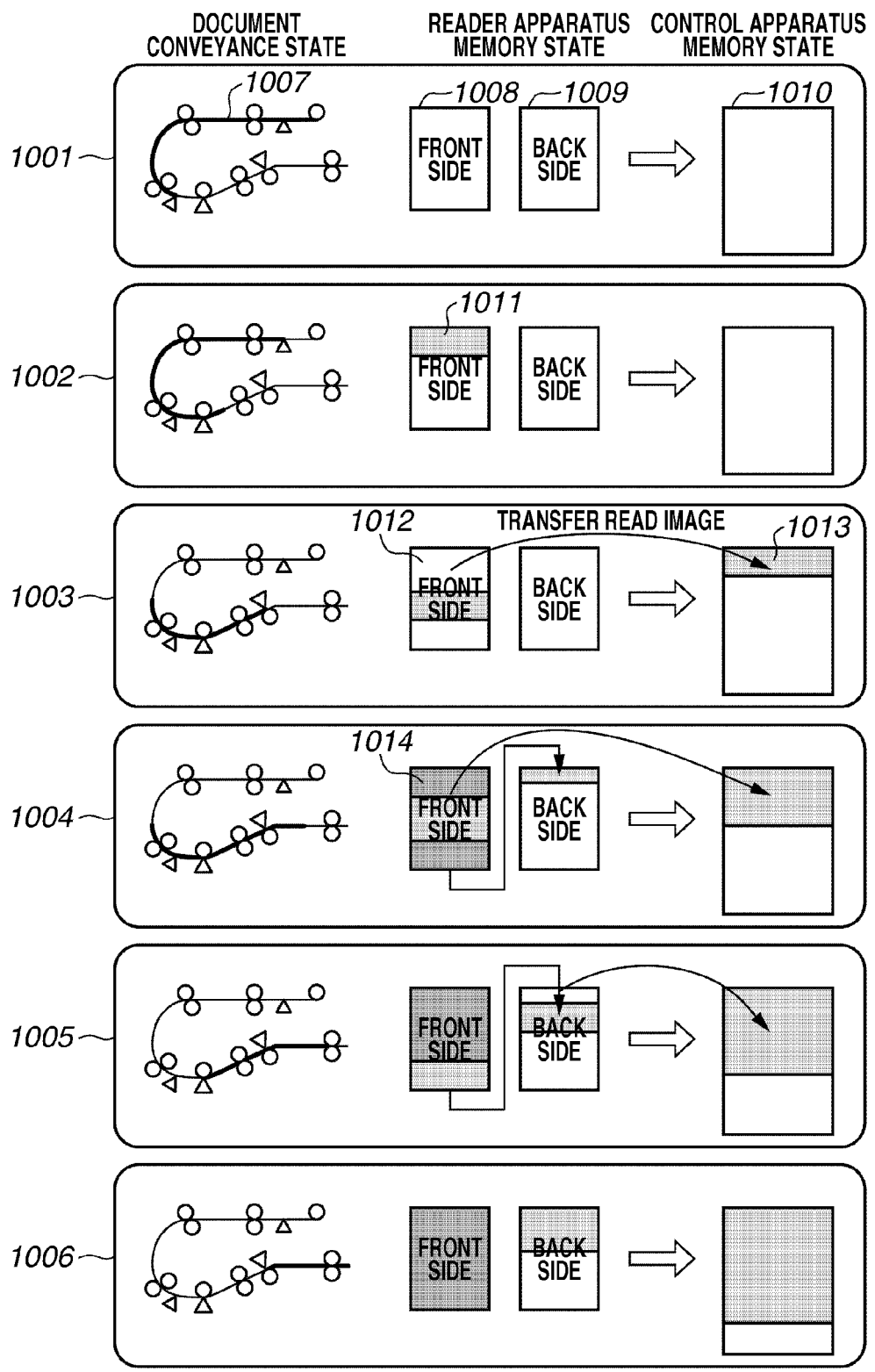
FIG. 8 illustrates document conveyance states in a reader apparatus and memory area use states.
Figure 9:
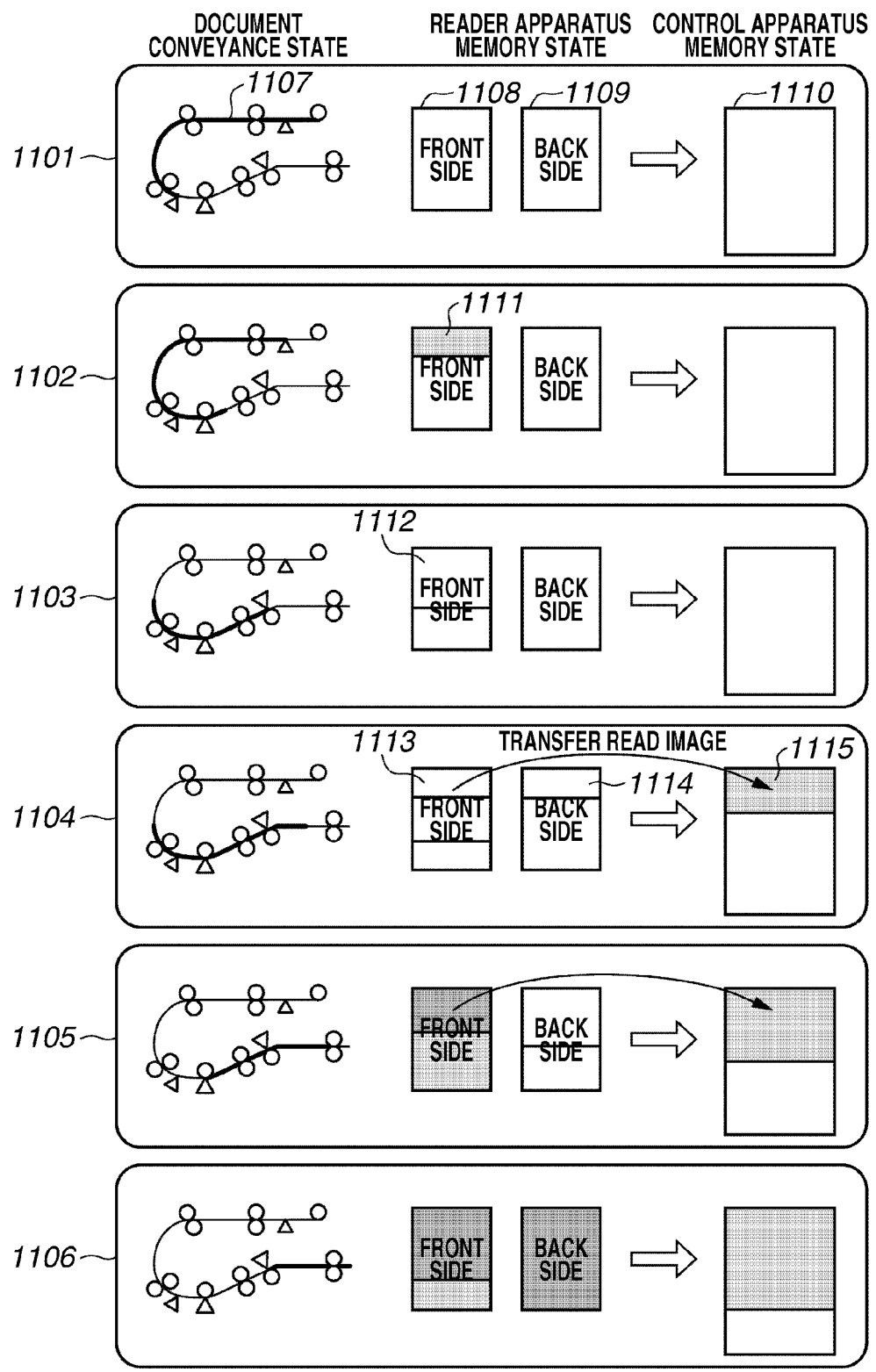
FIG. 9 illustrates document conveyance states in the reader apparatus and memory area use states.

More specifically, the image sensor IS1 reads the front-side image of a conveyed document, and the image sensor IS2 reads the back-side image of a conveyed document. As illustrated in FIGS. 8 and 9, the memory 114 includes a first area and a second area in which front-side image data and back-side image data read by the image sensors IS1 and IS2 can be stored, respectively.

If the document size is smaller than a maximum document size, the memory 114 can store two pages of color image data.

Figure 2:
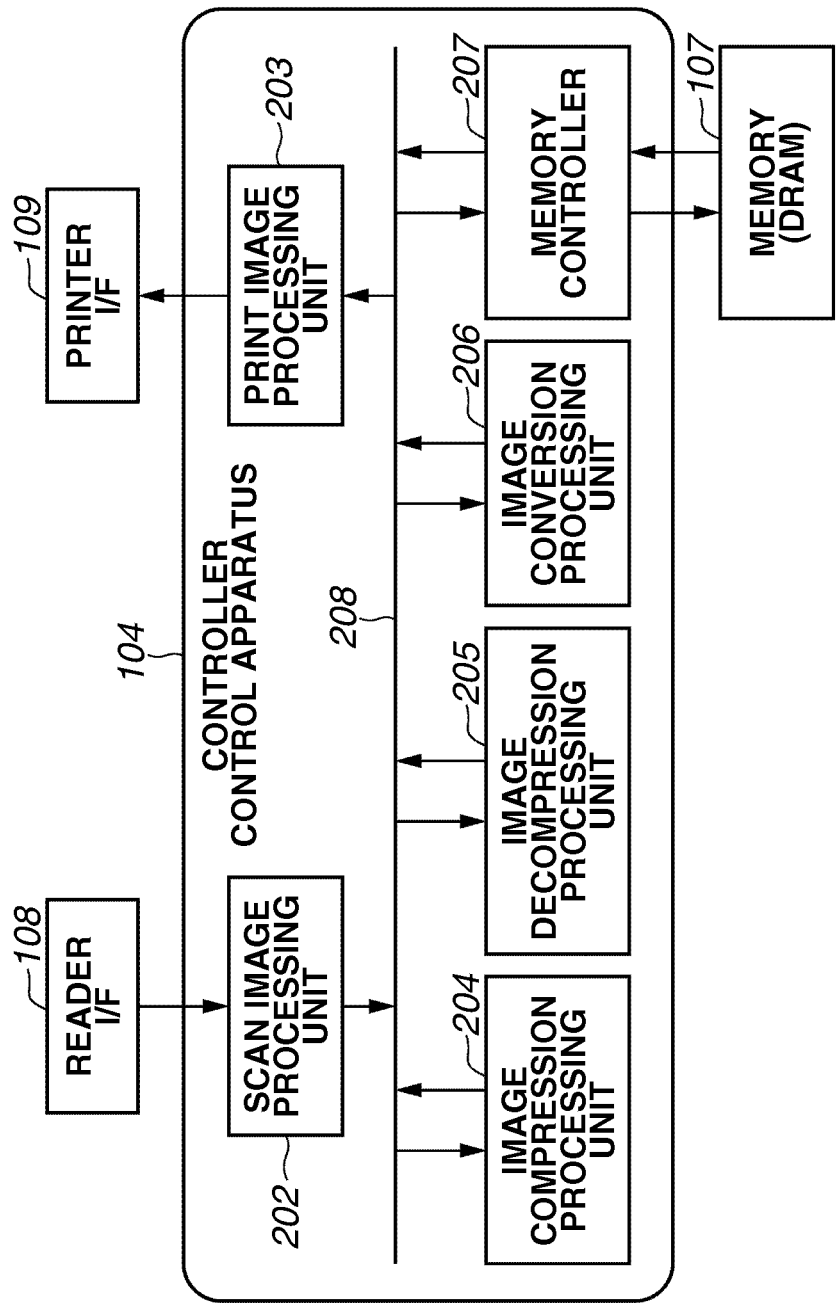
FIG. 2 is a block diagram illustrating a configuration of a controller control apparatus.

FIG. 2 is a block diagram illustrating a configuration of the controller control apparatus 104 illustrated in FIG. 1.

In FIG. 2, the controller control apparatus 104 is connected to a scan image processing unit 202, a print image processing unit 203, an image compression processing unit 204, an image decompression processing unit 205, an image conversion processing unit 206, and a memory controller 207 via a data bus 208. The memory controller 207 is connected to the external memory (DRAM) 107, and the individual image processing units in the controller control apparatus 104 can access the memory 107 via the memory controller 207.

In addition, the scan image processing unit 202 and the print image processing unit 203 are connected to the reader I/F 108 and the printer I/F 109, respectively.

The scan image processing unit 202 receives image data that has been processed by the reader apparatus 102 via the reader I/F 108. After processing the image data, the scan image processing unit 202 stores the image data in the memory 107.

The scan image processing unit 202 executes image processing, such as correction of color misregistration between image sensors, a filtering process, a magnification process for image enlargement/reduction, a gamma correction process, and an automatic color/monochrome determination process.

The print image processing unit 203 reads image data stored in the memory 107, processes the read image data, and transfers the image data to the printer apparatus 103 via the printer I/F 109. The print image processing unit 203 executes image processing, such as a density conversion process, a frame elimination process, an image synthesis process, and a thin-line correction process.

The image compression processing unit 204 reads raw image data stored in the memory 107, executes an image compression process based on an image format such as the Joint Photographic Experts Group (JPEG) or the Joint Bi-level Image Experts Group (JBIG), and stores the compressed image data in the memory 107.

The image decompression processing unit 205 reads image data in JPEG or JBIG format stored in the memory 107, executes an image decompression process to decompress the data into raw image data, and stores the raw image data in the memory 107.

The image conversion processing unit 206 reads image data stored in the memory 107, executes an image conversion process, and stores the image data in the memory 107, again. The image conversion processing unit 206 executes image processing such as a color conversion process, a background color removal process, a density correction process, and a filtering process.

Figure 3:
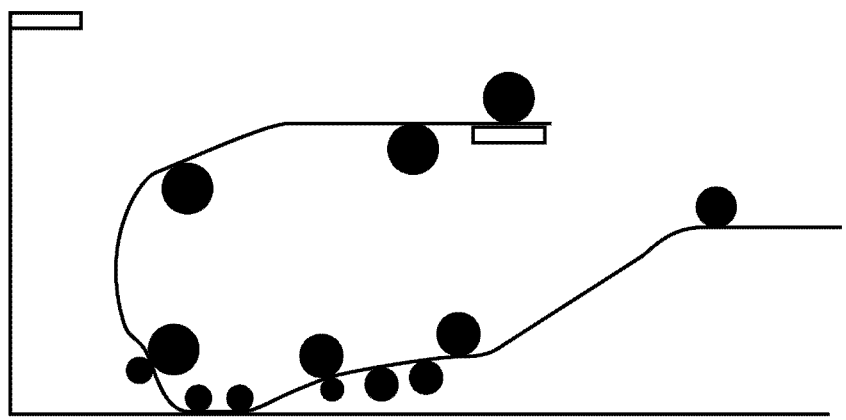
FIG. 3 is across section illustrating a configuration of an automatic document feeder.

FIG. 3 is across section illustrating a configuration of the automatic document feeder 112 illustrated in FIG. 1.

In FIG. 3, the automatic document feeder 112 used in the present exemplary embodiment has a two-sided simultaneous reading function. That is, the automatic document feeder 112 can read both the front- and back-side document images in a single document conveyance.

FIG. 4 illustrates a document conveyance path 905 of the automatic document feeder 112 illustrated in FIG. 3. FIG. 4 schematically illustrates portions relating to the reading apparatus according to the present exemplary embodiment. The arrows in FIG. 4 represent the document conveyance direction.

FIG. 4 also illustrates s position 901 of the image sensor IS1 reading a document front-side image and a position 902 of the image sensor IS2 reading a document back-side image. In addition, FIG. 4 illustrates positions 903 and 904 of the document detection sensors S1 and S2 detecting passage of documents along the document conveyance path 905. Documents are fed and discharged along the document conveyance path 905 in the automatic document feeder 112.

Next, document size detection executed in the automatic document feeder 112 in a document size mixed mode will be described. There are copying apparatuses that read document images in a document size mixed mode. In this mode, documents of different sizes are stacked on the automatic document feeder 112, and when a document is read, the document size thereof is automatically detected.

Examples of such document size mixed mode include a document length mixed mode and a document length and width mixed mode. In the former mode, the copying apparatuses read documents having the same width in the main-scanning direction (in a direction perpendicular to the document conveyance direction). In the latter mode, the copying apparatuses read documents having various widths in the main-scanning direction.

In a document size mixed mode, the size of a document is detected by the document width in the main-scanning direction detected when feeding of the document is started and by the time when the document passes through the document detection sensors S1 and S2 arranged along the conveyance path 905 illustrated in FIG. 4 during conveyance of the document. The following description will be made based on a document size mixed mode where documents have sizes STMT, LTR-R, LGL (FIG. 5).

Figure 5:
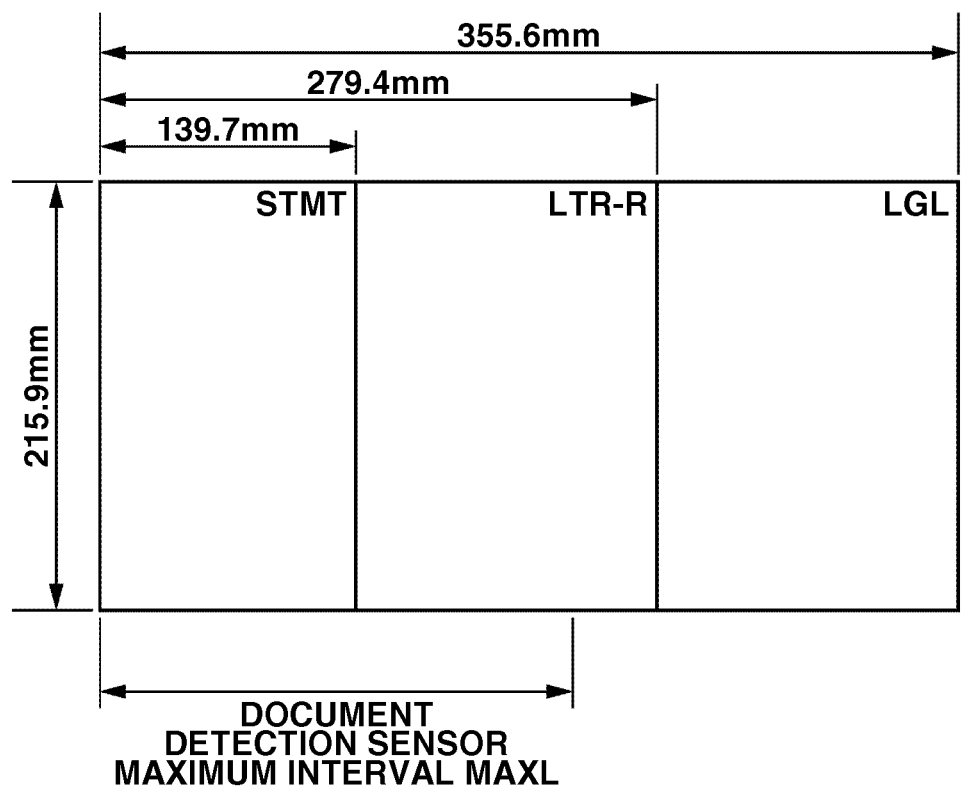
FIG. 5 illustrates sizes of documents conveyed from the automatic document feeder.

FIG. 5 illustrates sizes of documents conveyed from the automatic document feeder 112 illustrated in FIG. 3.

As illustrated in FIG. 5, sizes STMT, LTR-R, and LGL have the same document width in the main-scanning direction. In other words, FIG. 5 illustrates a document length mixed mode.

In addition, based on the automatic document feeder 112 according to the present exemplary embodiment, a maximum interval MAXL between the document detection sensors S1 and S2 arranged along the document conveyance path 905 is greater than the document length of document size STMT in the sub-scanning direction and less than the document length of document size LTR-R, as illustrated in FIG. 5. The maximum interval MAXL is the length between the positions 903 and 904 illustrated in FIG. 4.

Thus, even when document sizes STMT, LTR-R, and LGL having the same width are used, when the document leading edge of a document reaches the position (position 904 in FIG. 9) of the document detection sensor S1, the reader control apparatus 111 can determine whether or not the fed document is size STMT. However, the reader control apparatus 111 cannot determine whether the fed document is the size LTR-R or LGL.

For example, based on the automatic document feeder 112 according to the present exemplary embodiment, the maximum interval MAXL between the document detection sensors S1 and S2 arranged along the document conveyance path 905 is set to 230 mm (<279.4 mm).

In this case, when the document leading edge of a document reaches the position (position 904 in FIG. 4) of the document detection sensor S1, the reader control apparatus 111 can determine whether the document has a length of 230 mm or more. However, the reader control apparatus 111 cannot determine whether the document has size LTR-R or LGL. To determine this, the automatic document feeder 112 needs to convey the document 50 mm further.

However, in the automatic document feeder 112 according to the present exemplary embodiment, the image sensor IS1 reading a document front-side image is present at the position 901 in FIG. 4 within 280 mm from the conveyance path start point along the document conveyance path 905.

Thus, by the time a document reaches the position where document size LTR-R or LGL can be determined, the image sensor IS1 has already started reading the front-side image of the document. Thus, if document sizes LTR-R and LGL are mixed, in either case, the document size cannot be determined before image reading.

Next, a relationship between the two-sided simultaneous reading function of the automatic document feeder 112 and the capacity of the memory 114 in the reader apparatus 102 will be described.

The automatic document feeder 112 according to the present exemplary embodiment has a two-sided simultaneous reading function. The two-sided simultaneous reading function is realized by arranging the image sensor IS2 reading a document back-side image at downstream of the image sensor IS1 reading a document front-side image along the document conveyance path 905 in the automatic document feeder 112.

Thus, the image sensor IS2 starts reading the back-side image of a document a certain time period after reading the front-side image of the document.

Transfer of read image data from the reader control apparatus 111 to the control apparatus 101 is executed per page, and transfer of a document read request from the control apparatus 101 to the reader control apparatus 111 is also executed per page.

In other words, when the control apparatus 101 sends a document read request to the reader control apparatus 111, the automatic document feeder 112 starts conveyance of a document. First, the automatic document feeder 112 starts reading a document front-side image, by using the image sensor IS1. Next, by using the image sensor IS2, the automatic document feeder 112 starts reading a document back-side image. The front-side and back-side images are simultaneously read.

However, the reader control apparatus 111 transfers only the read document front-side image data to the control apparatus 101. The reader control apparatus 111 temporarily stores the document back-side image data read by the image sensor IS2 in the memory 114 of the reader apparatus 102.

Next, when the reader control apparatus 111 completes transferring the read document front-side image data, the control apparatus 101 requests the reader control apparatus 111 to read a document back-side image. In response, the reader apparatus 102 reads the back-side image data, which has already been read and stored in the memory 114, and transfers the image data to the control apparatus 101. In this way, the reader apparatus 102 completes reading of the document back-side image.

Thus, at least, the memory 114 included in the reader apparatus 102 needs to have a capacity capable of storing one page of image data of a maximum document size.

The reader apparatus 102 according to the present exemplary embodiment includes the memory 114 of 256 megabytes (MB). With this memory capacity, the memory 114 can store one page of color image data (24 bits per pixel) of document size A3 or LGL. If the document size is A4 or LTR, the memory 114 can store two pages of image data. In addition, if the document size is A3 or LGL, the memory 114 can store two pages of grayscale image data (8 bits per pixel).

Next, a relationship between document size detection executed by the reader apparatus 102 and image processing executed by the control apparatus 101 will be described.

In document image reading executed by the copying apparatus according to the present exemplary embodiment, before the reader apparatus 102 transfers read image data to the control apparatus 101, the document size of the read image data needs to be determined. This is because, when the controller control apparatus 104 executes image processing, the size of the image to be processed needs to be set.

Thus, for example, when documents are read in an automatic document size detection mode or in a document size mixed mode, the following operation is needed. That is, before the reader apparatus 102 transfers read image data, the document size needs to be determined, and the reader apparatus 102 needs to notify the control apparatus 101 of information about the document size.

In addition, based on the copying apparatus according to the present exemplary embodiment, both the reader apparatus 102 and the control apparatus 101 can execute a magnification process of enlarging/reducing read image data. Thus, a prerequisite specification is that a magnification process executed by the control apparatus 101 as image processing is also executed by the reader apparatus 102.

Since the reader apparatus 102 can also execute a magnification process, the magnification ratio range of the control apparatus 101 can be narrowed. As a result, the capacity of the memory (static random access memory (SRAM)) necessary for the magnification process can be reduced, achieving cost reduction.

Because of the above reasons, before the reader apparatus 102 transfers read image data to the control apparatus 101, contents of the magnification processes (magnification ratios of the reader apparatus 102 and the control apparatus 101) need to be determined, and the reader apparatus 102 needs to execute a magnification process.

In particular, if an automatic magnification function that automatically determines a magnification ratio of read image data based on a document size and an output sheet size is used, unless the document size of the read image data is determined, the magnification ratio cannot be determined.

Thus, in view of these magnification processes, before the reader apparatus 102 transfers read image data to the control apparatus 101, the document size needs to be determined.

Next, problems solved by the present invention will be described using the present exemplary embodiment. When operating in a document length mixed mode, as described above, the automatic document feeder 112 according to the present exemplary embodiment cannot determine whether the document is size LTR-R or LGL before starting image reading.

In addition, when executing image reading in a two-sided simultaneous reading mode and in a color mode, if the size of document image data is LTR-R, the memory 114 of the reader apparatus 102 can store two pages of front- and back-side image data. However, if the document size is LGL, the memory 114 can store only one page of image.

In addition, after reading of a document front-side image is started, there is a time difference between when the document size (LTR-R or LGL) is determined and reading of a document back-side image is started.

Thus, when reading of a document front-side image is started, the memory 114 of the reader apparatus 102 stores read image data, and the reader apparatus 102 notifies the control apparatus 101 of the document size between when the document size is determined and when reading of a back-side image is started.

Subsequently, after the control apparatus 101 completes necessary processes such as setting of image processing, the reader apparatus 102 transfers the front-side image data stored in the memory 114 to the control apparatus 101. In addition, the memory 114 of the reader apparatus 102 may store the document back-side image data.

However, it is difficult to guarantee that the time required from when the reader apparatus 102 notifies the control apparatus 101 of the document size of read image to when the control apparatus 101 executes setting of image processing is always shorter than the time required from when the document size is determined to when reading of a back-side image is started. Thus, it is difficult to adopt the above process to solve the problems.

In addition, as another solution, if the document size LTR-R or LGL cannot be determined in a document length mixed mode, the reader apparatus assumes that the document size is the larger size LGL, reads an image, and transfers the image data to the control apparatus 101.

Next, the control apparatus 101 stores the read image data in the memory 107. After the document size is determined, the control apparatus 101 waits to be notified of an actual document size by the reader apparatus 102. Subsequently, when notified of an actual document size by the reader apparatus 102, the control apparatus 101 reads the image data stored in the memory 107 and creates the image data with the actual document size.

However, according to the present exemplary embodiment, while the scan image processing unit 202 of the controller control apparatus 104 illustrated in FIG. 2 executes a magnification process on image data, as illustrated in FIG. 2, the scan image processing unit 202 executes image processing on image data transferred from the reader apparatus 102. Subsequently, the controller control apparatus 104 stores the processed image data in the memory 107.

Thus, if the document size is not determined, the scan image processing unit 202 cannot execute a magnification process required for the automatic magnification function, for example. In addition, after image data is stored in the memory 107 of the controller control apparatus 104, no image processing function of the scan image processing unit 202 can be used. Thus, since image processing necessary to realize the automatic magnification function or the like cannot be executed, the problem cannot be solved by the above process.

In addition, as another solution, the memory 114 included in the reader apparatus 102 may be configured to have a capacity capable of storing two pages of 24-bit color image data of document size LGL. In this way, the reader apparatus 102 temporarily stores data read from document front- and back-side images in the memory 114. Subsequently, after the document size is determined, the reader apparatus 102 reads the image data from the memory 114 and transfers the image data to the control apparatus 101.

However, based on this method, by simple calculation, the memory 114 having twice as much capacity needs to be included in the reader apparatus 102. Since costs of the reader apparatus 102 are greatly affected, adoption of this method is not preferable. Next, inventive methods solving the above-described problems will be described in detail based on the present exemplary embodiment.

Figure 6B:
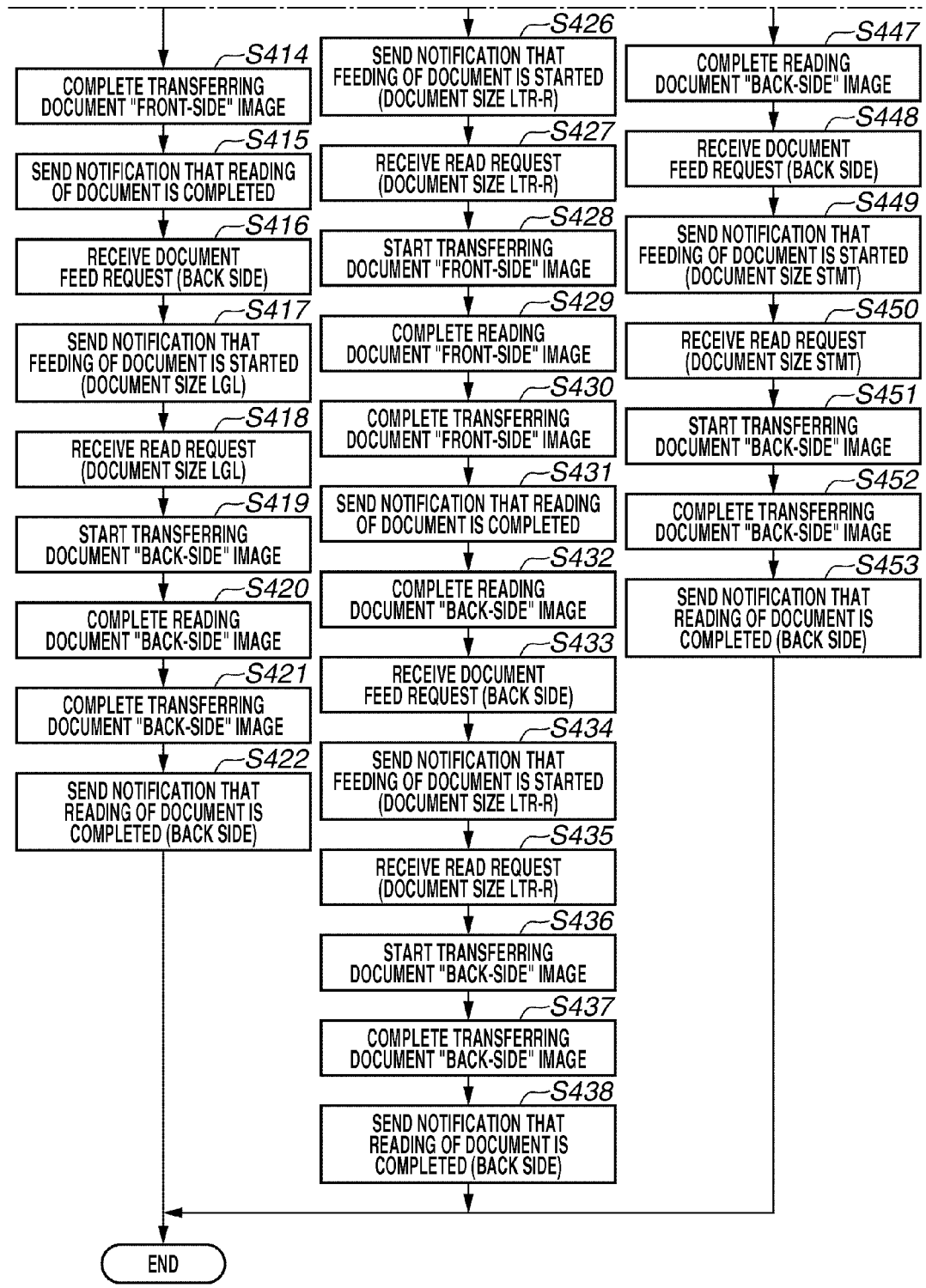
FIG. 6 (6A+6B) is a flow chart illustrating a control procedure of a reading apparatus.

FIGS. 6 (6A+6B) and 7 are flow charts illustrating a control procedure of a reading apparatus according to the present exemplary embodiment. This example corresponds to the reading control executed by the reader apparatus 102. Each of the steps is realized by causing the reader control apparatus 111 to load a control program from a ROM or the like to a random access memory (RAM) and to execute the control program.

FIGS. 8 and 9 illustrate a relationship between document conveyance states and memory area use states in the reader apparatus 102 according to the present exemplary embodiment. FIGS. 8 and 9 illustrate document conveyance states in the automatic document feeder 112 during a document reading process, and states of the memory 114 of the reader apparatus 102 and states of the memory 107 of the control apparatus 101 corresponding to the document conveyance states.

To distinguish positions 1007 and 1107 of a document conveyed by the automatic document feeder 112 having the configuration illustrated in FIG. 4, each of the document conveyance states in FIGS. 8 and 9 is represented by a thick solid line along the document conveyance path 905.

In addition, while FIGS. 8 and 9 illustrate storage states 1008, 1009, 1108, and 1109 in the memory 114 of the reader apparatus 102, these storage states are divided into two areas for ease of description. More specifically, the storage areas 1008 and 1108 store front-side images, and the storage areas 1009 and 1109 store back-side images. However, in reality, the memory 114 is formed by a continuous memory area.

In addition, each of the memories has a capacity capable of storing image data of the document size LTR or LTR-R. Memory states 1010 and 1110 in the memory 107 of the control apparatus 101 represent portions prepared as read image storage areas.

In addition, the capacity is sufficient for storing one page of read image of the document size LGL.

Figure 10:
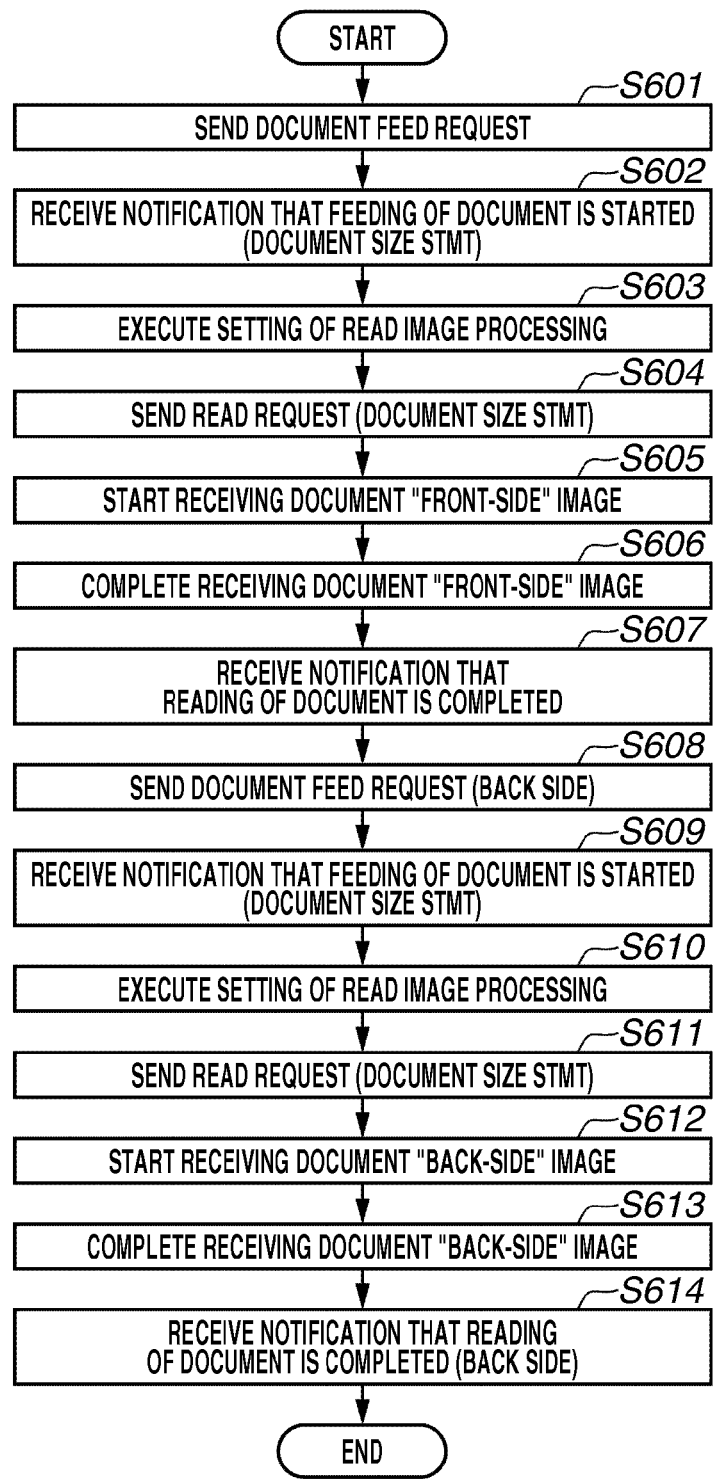
FIG. 10 is a flow chart illustrating a control procedure of a control apparatus of the copying apparatus.
Figure 11:
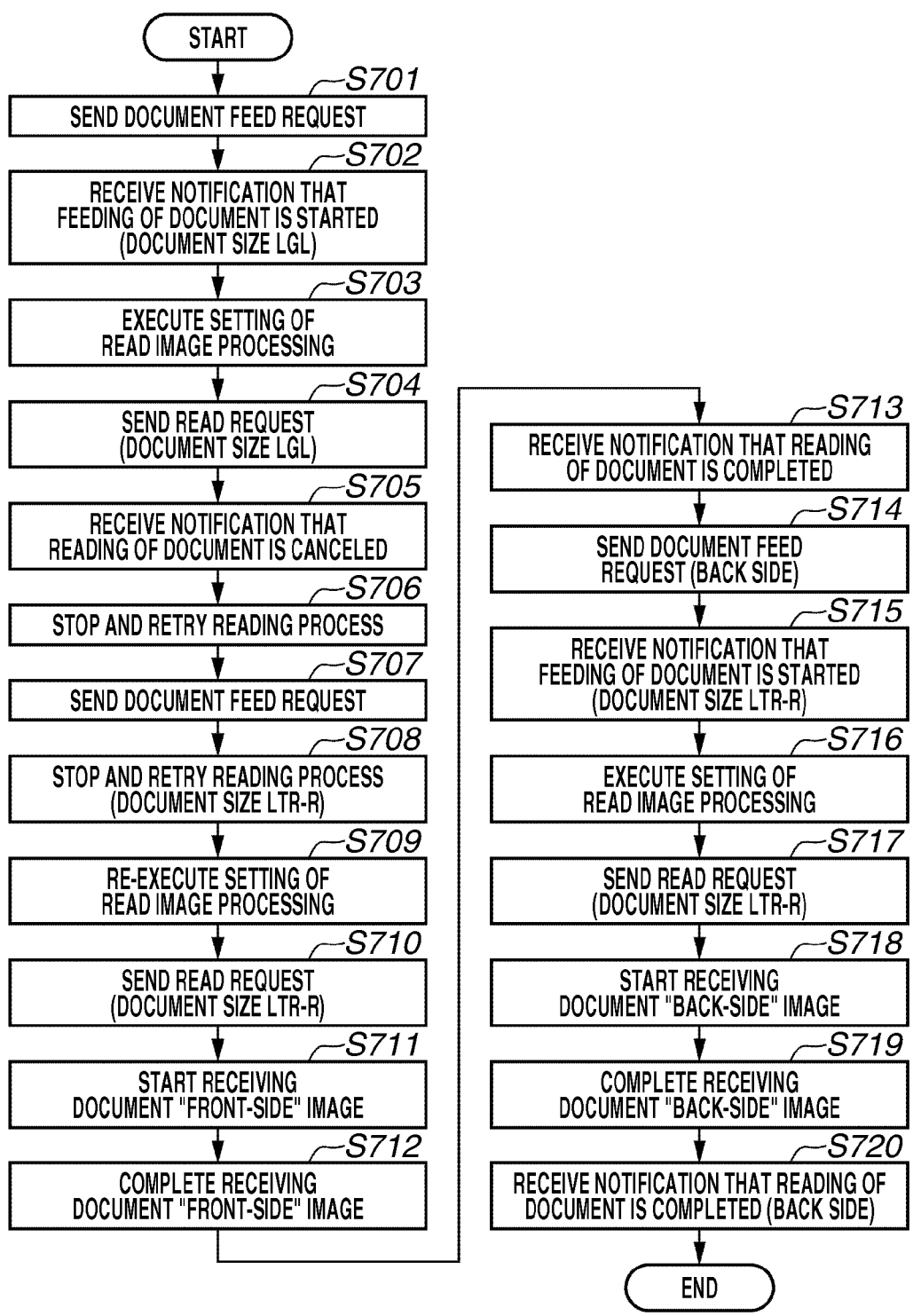
FIG. 11 is a flow chart illustrating a control procedure of the control apparatus of the copying apparatus.

FIGS. 10 and 11 are flow charts illustrating a control procedure of the control apparatus 101 of the copying apparatus according to the present exemplary embodiment. These examples illustrated in FIGS. 10 and 11 correspond to the reading control by the control apparatus 101 executed on image data sent from the reader apparatus 102. Each of the steps is realized by causing the controller control apparatus 104 of the control apparatus 101 to load a control program from a ROM or the like to a RAM and to execute the control program.

The copying machine starts reading a document image when a user enters a job via the operation unit 105 of the control apparatus 101. When a user enters a job, based on settings of the job, the controller control apparatus 104 starts an image forming process and a document image read process.

In a document image read process, first, in steps S601 and S701, the controller control apparatus 104 sends a document feed request to the reader control apparatus 111. Along with the document feed request, the controller control apparatus 104 sends parameters indicating a read mode to the reader control apparatus 111. For example, the parameters indicate whether image reading needs to be executed in a color mode or in a grayscale mode, whether image reading needs to be executed on one side or two sides of a document, and whether image reading needs to be executed in a document size mixed mode.

In step S401, the reader apparatus 102 receives a document feed request from the controller control apparatus 104, and in step S402, the reader control apparatus 111 determines which image read mode is specified. In this example, the reader control apparatus 111 determines whether the reader apparatus 102 needs to read images on both sides of a document in a color mode and in a document size mixed mode.

In step S402, if the reader control apparatus 111 determines that the reader apparatus 102 needs to read images on both sides of a document in a color mode and in a document size mixed mode (YES in step S402), the operation proceeds to step S403. After step S403, the operation proceeds to a read process unique to the present invention solving the above problems.

Figure 7:
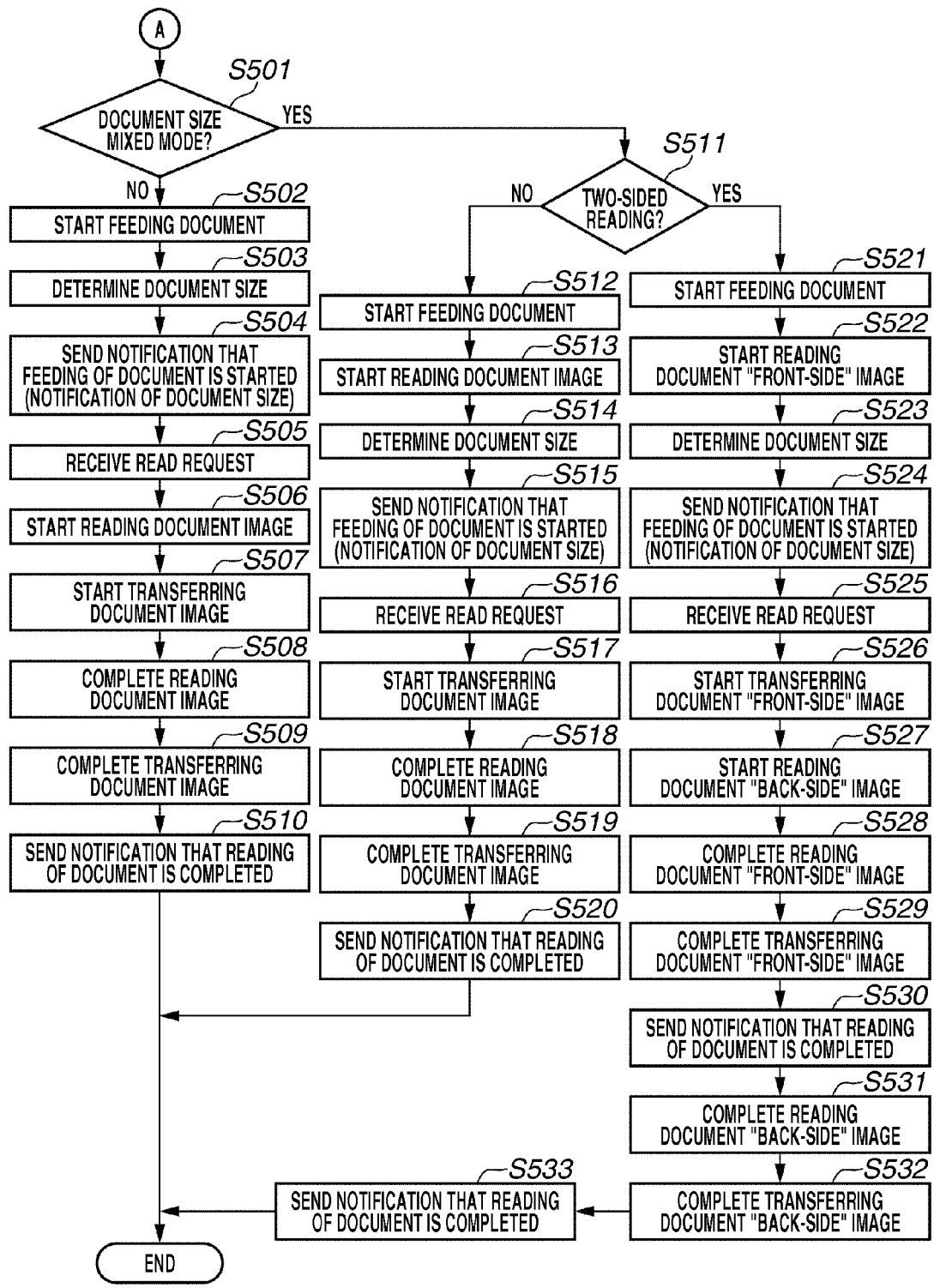
FIG. 7 is a flow chart illustrating a control procedure of the reading apparatus.

On the other hand, in step S402, if the reader control apparatus 111 determines that the reader apparatus 102 does not need to read images on both sides of a document in a color mode and in a document size mixed mode (NO in step S402), the operation proceeds to a normal read process illustrated by steps after step S501 in FIG. 7.

Hereinafter, assuming that the reader control apparatus 111 determines that the reader apparatus 102 needs to read images on both sides of a document in a color mode and in a document size mixed mode, the inventive process solving the above problems will be described. The following description will be made based on a document length mixed mode where document sizes STMT, LTR-R, and LGL are used.

If requested to read images on both sides of a document in a color mode and in a document size mixed mode (YES in step S402), in step S403, the reader control apparatus 111 starts feeding a document mounted on the automatic document feeder 112. The fed document is conveyed along the document conveyance path 905 in the automatic document feeder 112. During the conveyance, the document size is determined based on information output from the document detection sensors S2 and S1 arranged along the document conveyance path 905.

Before the leading edge of the document reaches the document detection sensor S1 that is arranged along the document conveyance path 905 closest to the image sensor IS1 reading a front-side image, in step S404, the reader control apparatus 111 starts executing tentative determination on the size of the fed document. Next, in step S405, the reader control apparatus 111 determines whether the fed document is size STMT among sizes STMT, LTR-R, and LGL (in this step, whether the document size is LTR-R or LGL cannot be determined).

In step S405, if the reader control apparatus 111 determines that the fed document is size STMT (NO in step S405), the operation proceeds to step S439. If the reader control apparatus 111 determines that the fed document has size LTR-R or LGL (YES in step S405), the operation proceeds to step S406.

First, a process to be executed when the reader control apparatus 111 determines that the document size is STMT in the tentative document size determination will be described. Since the document size is determined before the reader apparatus 102 starts reading a document image, the reader control apparatus 111 executes a normal document read process. That is, in step S439, the reader control apparatus 111 notifies the controller control apparatus 104 that the reader control apparatus 111 has started feeding a document and that the document size is STMT.

In response, in step S602, the controller control apparatus 104 receives the notification that feeding of a document is started from the reader control apparatus 111, and in step S603, the controller control apparatus 104 executes setting of scan image processing. Upon completion of setting of scan image processing, in step S604, the controller control apparatus 104 sends a document read request and the read document image size (STMT) to the reader control apparatus 111.

In step S440, the reader control apparatus 111 receives the read request from the controller control apparatus 104. Next, when the reader control apparatus 111 conveys the document and the document leading edge reaches the image sensor IS1 reading a front-side image, in step S441, the reader apparatus 102 starts reading the front-side image of the document.

The reader control apparatus 111 executes necessary image processing on the read document front-side image data. Next, in step S442, the reader control apparatus 111 transfers the read image data to the controller control apparatus 104, without storing the read image data in the memory 114 in the reader apparatus 102. In step S605, the controller control apparatus 104 starts receiving the front-side image data from the reader control apparatus 111.

Next, when the document is further conveyed and the document leading edge reaches the image sensor IS2 reading a document back-side image, in step S443, the reader control apparatus 111 starts reading the document back-side image.

Next, after executing necessary image processing on the read document back-side image data, the reader control apparatus 111 stores the image data in the memory 114 of the reader apparatus 102. Next, after the reader apparatus 102 further conveys and reads the document, in step S444, the reader control apparatus 111 completes reading the document front-side image.

Next, in step S445, the reader control apparatus 111 completes transferring the read document front-side image data to the controller control apparatus 104. Next, after completing transferring the document front-side image data to the controller control apparatus 104, in step S446, the reader control apparatus 111 sends a notification that reading of the document is completed to the controller control apparatus 104.

Next, in step S447, the reader control apparatus 111 completes reading the document back-side image and storing the read back-side image data in the memory 114. In step S606, the controller control apparatus 104 completes receiving the document front-side image data from the reader control apparatus 111. Next, in step S607, the controller control apparatus 104 receives a notification from the reader apparatus 102 that reading of the document is completed. Next, in step S608, for reading of the document back-side image, the controller control apparatus 104 sends a document feed request to the reader control apparatus 111.

In step S448, the reader control apparatus 111 receives the document feed request for reading the document back-side image. In step S449, the reader control apparatus 111 notifies the controller control apparatus 104 of start of feeding of the document and of the document size.

In reality, since the document feed process and the image reading process have already been completed, the reader control apparatus 111 simply sends the notification of start of feeding the document to read the document back-side image to the controller control apparatus 104 on a sequence basis. Namely, no document is actually fed.

In step S609, the controller control apparatus 104 receives the notification from the reader control apparatus 111 that feeding of a document is started. Next, in step S610, the controller control apparatus 104 executes setting of scan image processing, as in the case of reading the front-side image. Next, in step S611, the controller control apparatus 104 sends a document back-side image read request to the reader control apparatus 111.

In step S450, the reader control apparatus 111 receives the back-side image read request from the controller control apparatus 104. Next, in step S451, the reader control apparatus 111 reads the document back-side image data stored in the memory 114 and transfers the read image data to the controller control apparatus 104. In step S612, the controller control apparatus 104 starts receiving the back-side image data from the reader control apparatus 111.

Next, in step S452, the reader control apparatus 111 completes transferring the image data to the controller control apparatus 104. In step S613, the controller control apparatus 104 completes receiving the document back-side image data from the reader control apparatus 111.

Next, in step S453, the reader control apparatus 111 sends a notification that reading of the document back-side image is completed to the controller control apparatus 104. In this way, reading of images on a single document is completed. In step S614, the controller control apparatus 104 receives the notification that reading of the document back-side image data is completed from the reader control apparatus 111. Thus, the controller control apparatus 104 ends the process illustrated in FIG. 10.

This process flow that has so far been described corresponds to a normal image read process where the document size is determined before image reading of the document is started.

On the other hand, in a document length mixed mode, if the document size is LTR-R or LGL, the document size is not determined before image reading is started. Next, a process in this case will be described. The present process is executed when the document size is LTR-R or LGL (YES in step S405 in FIG. 6).

First, if an image read process is executed in a document size mixed mode where document sizes LTR-R and LGL are used, in step S701, the controller control apparatus 104 sends a document feed request to the reader control apparatus 111. At this point, that is, prior to image reading, the reader control apparatus 111 cannot determine whether the document size of a document being fed is LTR-R or LGL.

Thus, the reader control apparatus 111 assumes that the document size is LGL, which is the maximum document size conveyable. Then, in step S406, the reader control apparatus 111 notifies the controller control apparatus 104 of the tentative document size and of start of feeding of a document.

In step S702, the controller control apparatus 104 receives the notification that feeding of an LGL document is started from the reader control apparatus 111, and the operation proceeds to step S703.

In step S703, the controller control apparatus 104 executes setting of scan image processing for the LGL document. More specifically, the controller control apparatus 104 sets an image size necessary for image processing or calculates/sets a magnification ratio for the automatic magnification function. Upon completion of setting of the image processing, in step S704, the controller control apparatus 104 sends an image read request for the LGL document to the reader control apparatus 111.

In step S407, the reader control apparatus 111 receives the read request from the controller control apparatus 104, and the operation proceeds to step S408. Next, when the reader control apparatus 111 conveys the document and the leading edge of the document reaches the image sensor IS1 reading a front-side image, in step S408, the reader control apparatus 111 starts reading the document front-side image.

After executing necessary image processing on the read front-side image data, the reader control apparatus 111 stores the image data in the memory 114 of the reader apparatus 102. FIGS. 8 and 9 illustrate states 1002 and 1102 of the memory 114 at this point.

As the states 1002 and 1102 in FIGS. 8 and 9 illustrate, the memory 114 of the reader apparatus 102 includes memory areas 1011 and 1111, respectively, in which image data read from the front side of the document is stored. Among the steps of the process executed by the reader control apparatus 111, identical steps will be described with reference to steps in FIG. 10.

When the reader apparatus 102 further conveys the document and the document trailing edge passes through the document detection sensor S2 arranged along the document conveyance path 905 in the automatic document feeder 112, the reader control apparatus 111 calculates the length of the document. The reader control apparatus 111 calculates the length of the document, based on the document conveyance speed and the time required from when the document leading edge is detected to when the document trailing edge is detected.

In step S409, the reader control apparatus 111 determines whether the document size is LTR-R or LGL. The subsequent image reading process varies depending on the document size determined by the reader control apparatus 111.

First, in step S410, the reader control apparatus 111 determines whether the determined document size is LGL. In step S410, if the reader control apparatus 111 determines that the determined document size is LGL (YES in step S410), the tentative document size set when the process of reading the document front-side image is started is correct. In addition, the read image process setting values set in the controller control apparatus 104 are also correct.

Thus, in step S411, the reader control apparatus 111 reads the document front-side image data stored in the memory 114 and starts transferring the image data to the controller control apparatus 104. If instructed by the controller control apparatus 104 to execute a magnification process, the reader control apparatus 111 executes the magnification process on the image data read from the memory 114 and transfers the image data to the controller control apparatus 104.

Next, the reader control apparatus 111 conveys the document further while reading the document front-side image. When the document leading edge reaches the position 902 of the image sensor IS2 reading a back-side image, in step S412, the reader control apparatus 111 starts reading the document back-side image.

FIG. 8 illustrates a state 1003 representing states of the memories in the reader apparatus 102 and the control apparatus 101 when the document leading edge reaches the position 902 of the image sensor IS2 reading a back-side image. Among the image data stored in the memory 114, image data in a memory area 1012 has already been transferred to the controller control apparatus 104.

A memory area 1013 represents a memory area in the memory 107 of the control apparatus 101. The memory area 1013 stores the document front-side image data sent from the reader control apparatus 111. As illustrated in a state 1004 in FIG. 8, the reader control apparatus 111 temporarily stores the read document back-side image data in the memory 114 of the reader apparatus 102, as in the case of a normal two-sided image reading process. The state 1004 illustrated in FIG. 8 represents memory states after the reader apparatus 102 starts reading the document back-side image.

The read document front-side image data is also written in the back-side read image storage area in the memory 114. This is because, when the document size is LGL, a front-side image storage area corresponding to the document size LTR cannot store all the image data of an LGL document.

However, since the front- and back-side image storage areas in the memory 114 form a continuous memory area, the memory 114 can store the image data, without problem. In addition, a memory area 1014 represents the document back-side image data stored in the memory 114.

As described above, if the document size is LGL, the back-side image storage area is not sufficient to store the document back-side image data. Thus, the document back-side image data is stored from the top of the front-side image storage area.

In other words, while the back-side image data is stored by overwriting the area in which the document front-side image data is stored, the document front-side image data stored in the area in which the document back-side image data is stored has already been transferred to the controller control apparatus 104. In addition, the speed at which the image data is transferred to the controller control apparatus 104 is greater than the speed at which the document back-side image data is read and stored. Therefore, overwriting by the document back-side image data does not destroy the document front-side image data.

Next, if the reader control apparatus 111 conveys the document further while reading the document front- and back-side image data, the document trailing edge reaches the position 901 of the image sensor IS1 reading a front-side image. In step S413, the reader control apparatus 111 completes reading the document front-side image.

Upon completion of reading of the document front-side image, the reader control apparatus 111 completes storing the front-side image data in the memory 114 of the reader apparatus 102. In step S414, the reader control apparatus 111 completes transferring the document front-side image data to the controller control apparatus 104.

In this way, upon completion of transferring the document front-side image data, in step S415, the reader control apparatus 111 sends a notification that reading of the document is completed to the controller control apparatus 104. In step S606, the controller control apparatus 104 completes receiving the document front-side image data from the reader control apparatus 111. In step S607, the controller control apparatus 104 receives the notification that reading of the document is completed. Upon completion of reading the document front-side image data, the controller control apparatus 104 starts reading the document back-side image data.

The document back-side image is read by the controller control apparatus 104 in the same way as the document front-side image is read.

First, in step S608, the controller control apparatus 104 sends a document feed request to the reader control apparatus 111. In step S416, the reader control apparatus 111 receives the document feed request from the controller control apparatus 104. In step S417, the reader control apparatus 111 notifies the controller control apparatus 104 of start of feeding of a document and of document size LGL.

While this document feed request is sent to read the document back-side image, the reader apparatus 102 does not actually feed a document. Namely, the document feed request and the notification of start of feeding of a document are exchanged between the reader control apparatus 111 and the controller control apparatus 104 only on a sequence basis.

In step S609, the controller control apparatus 104 receives the notification of start of feeding of a document from the reader control apparatus 111. In step S610, the controller control apparatus 104 executes setting of scan image processing in accordance with the given document size (LGL). Next, in step S611, the controller control apparatus 104 sends a read request to the reader control apparatus 111.

In step S418, the reader control apparatus 111 receives the read request from the controller control apparatus 104. Next, the reader control apparatus 111 reads the document back-side image data stored in the memory 114. In step S419, the reader control apparatus 111 transfers the read image data to the controller control apparatus 104.

As in the case of the transfer of the document front-side image data, if instructed by the controller control apparatus 104 to execute a magnification process, the reader control apparatus 111 executes the magnification process on the image data read from the memory 114. Next, the reader control apparatus 111 transfers the processed image data to the controller control apparatus 104.

During the above process, the reader control apparatus 111 continues to convey the document and read the document back-side image. Thus, when the document trailing edge reaches the image sensor IS2 reading a document back-side image, in step S420, the reader control apparatus 111 completes reading the document back-side image and storing the document back-side image data in the memory 114 of the reader apparatus 102.

Next, in step S421, the reader control apparatus 111 completes transferring the document back-side image data to the controller control apparatus 104. In step S422, the reader control apparatus 111 sends a notification that image reading is completed to the controller control apparatus 104. In this way, the image reading process is ended.

In step S613, the controller control apparatus 104 completes receiving the document back-side image data from the reader control apparatus 111. In step S614, upon receiving the notification that reading of the document is completed from the reader control apparatus 111, the controller control apparatus 104 completes reading the document back-side image. This is the image reading process executed when the document size is determined to be LGL.

Next, a process executed when the reader control apparatus 111 determines that the fed document size is LTR-R in step S410 will be described.

In step S410, if the reader control apparatus 111 determines that the document size is LTR-R, the tentative document size set in step S404 when the process of reading the document front-side image is started is incorrect. In addition, the read image process setting values set in the controller control apparatus 104 are also incorrect. Thus, in step S423, the reader control apparatus 111 sends a request for cancellation/retry of the document reading process to the controller control apparatus 104.

In step S705, the controller control apparatus 104 receives the request for cancellation of the document reading process. Next, in step S706, the controller control apparatus 104 stops the image reading process and retries the reading process. In step S707, the controller control apparatus 104 sends a document feed request to the reader control apparatus 111, again.

Next, in step S425, the reader control apparatus 111 receives the document feed request from the controller control apparatus 104. In step S426, the reader control apparatus 111 notifies the controller control apparatus 104 of start of feeding of a document and of the document size (LTR-R).

This notification of start of document feeding is sent on an image reading sequence basis. The reader apparatus 102 does not actually feed a document again.

In step S424, while conveying the document, the reader control apparatus 111 starts reading the front-side image and storing the image data in the memory 114 of the reader apparatus 102. When the document leading edge reaches the image sensor IS2 reading a document back-side image, the reader control apparatus 111 starts reading the document back-side image.

The read document back-side image data is stored in the second area in the memory 114.

In step S708, the controller control apparatus 104 receives the notification of start of document feeding from the reader control apparatus 111. In step S709, the controller control apparatus 104 re-executes setting of image read processing based on the given document size (LTR-R).

Next, in step S710, the controller control apparatus 104 sends a read request to the reader control apparatus 111. In step S427, the reader control apparatus 111 receives the read request from the controller control apparatus 104 for the document front-side image. Next, in step S428, the reader control apparatus 111 reads the document front-side image data stored in the memory 114 of the reader apparatus 102 and transfers the image data to the controller control apparatus 104.

If instructed by the controller control apparatus 104 to execute a magnification process, the reader control apparatus 111 executes the magnification process on the image data read from the memory 114 and transfers the processed image data to the controller control apparatus 104.

FIG. 9 includes a data processing state 1104 illustrating states of the memories 114 and 107 of the reader apparatus 102 and the control apparatus 101, respectively, at this point.

A memory area 1113 stores document front-side image data, and the reader control apparatus 111 transfers the image data from the memory area 1113 to the controller control apparatus 104. A memory area 1114 stores document back-side image data. A memory area 1115 in the memory 107 of the control apparatus 101 stores the document front-side image data sent from the reader control apparatus 111.

If the document size is LTR-R, since the memory 114 of the reader apparatus 102 can store two pages of image data, that is, the front- and back-side images, as illustrated in the data processing state 1104, the image data is stored in the respective memory areas (the first and second areas).

Next, if the reader control apparatus 111 further conveys the document and reads the document front- and back-side images, the document trailing edge reaches the image sensor IS1 reading a document front-side image. In step S429, the reader control apparatus 111 completes reading the front-side image and storing the front-side image data in the memory 114 of the reader apparatus 102.

Next, in step S430, the reader control apparatus 111 completes transferring the front-side image data to the controller control apparatus 104. In step S431, the reader control apparatus 111 sends a notification that reading of the document is completed to the controller control apparatus 104.

In step S712, the controller control apparatus 104 is notified by the reader control apparatus 111 that transferring the document front-side image is completed. Next, in step S713, the controller control apparatus 104 receives the notification that reading of the document is completed. In this way, the controller control apparatus 104 completes reading of the document front-side image. Next, the controller control apparatus 104 starts reading of the document back-side image.

As in the case of reading the front-side image, in step S714, the controller control apparatus 104 sends a document feed request to the reader control apparatus 111. In step S433, the reader control apparatus 111 receives the document feed request from the controller control apparatus 104. Next, in step S434, the reader control apparatus 111 notifies the controller control apparatus 104 that feeding of a document is started and the document size is LTR-R.

This notification that feeding of a document is started is also sent on an image reading sequence basis. Thus, the reader apparatus 102 does not actually feed a document. During this period, the reader apparatus 102 further conveys the document and reads the document back-side image. Thus, when the document trailing edge reaches the image sensor IS2 reading a document back-side image, in step S432, the reader apparatus 102 completes reading the document back-side image and storing the image data in the memory 114 of the reader apparatus 102.

In step S715, the controller control apparatus 104 receives the notification that feeding of a document is started from the reader apparatus 102. Accordingly, in step S716, the controller control apparatus 104 executes setting of read image processing based on the given document size (LTR-R). In step S717, the controller control apparatus 104 sends a read request to the reader control apparatus 111.

In step S435, the reader control apparatus 111 receives the read request from the controller control apparatus 104 for the document back-side image. Next, after reading the document back-side image data stored in the memory 114 of the reader apparatus 102, in step S436, the reader control apparatus 111 starts transferring the read image data to the controller control apparatus 104.

If instructed by the controller control apparatus 104 to execute a magnification process, the reader control apparatus 111 executes the magnification process on the image data read from the memory 114. Next, the reader control apparatus 111 transfers the image data to the controller control apparatus 104.

Next, in step S437, the reader control apparatus 111 completes transferring the document back-side image data to the controller control apparatus 104. In step S438, the reader control apparatus 111 sends a notification that reading of the image is completed to the controller control apparatus 104. In this way, the reader apparatus 102 completes the image reading process.

In step S718, the controller control apparatus 104 starts receiving the document back-side image data from the reader control apparatus 111. In step S719, the controller control apparatus 104 completes receiving the document back-side image data from the reader control apparatus 111. Next, in step S720, the controller control apparatus 104 receives the notification that reading of the document is completed from the reader control apparatus 111. In this way, the controller control apparatus 104 completes reading the document back-side image. The image reading process executed when the document size is determined to be LTR-R has thus been described.

Based on the image reading process as described above, even if the document size is not determined before an image is read in a document size mixed mode, there is no need to increase the capacity of the memory 114 included in the reader apparatus 102. In addition, necessary image processing can be executed during image reading. Thus, both cost reduction and image reading process functions can be realized.

Next, a normal document read process (NO in step S402) will be described with reference to FIG. 7.

In step S501, the reader control apparatus 111 determines whether the document conveyance mode is a document size mixed mode. If the reader control apparatus 111 determines that the document conveyance mode is a document size mixed mode (YES in step S501), the operation proceeds to step S511. If not (NO in step S501), the operation proceeds to step S502, and a one-sided document reading process is executed.

Next, in step S502, the reader control apparatus 111 starts feeding a document from the automatic document feeder 112. Next, in step S503, the reader control apparatus 111 determines the size of the document to be read, based on the time from when the document detection sensor S1 detects the document leading edge to when the document detection sensor S1 detects the document trailing edge and on the document conveyance speed.

Next, in step S504, the reader control apparatus 111 notifies the controller control apparatus 104 of the determined document size. Upon receiving a document read request from the controller control apparatus 104, in step S506, the reader control apparatus 111 starts reading the conveyed document image via the image sensor IS1.

Next, in step S507, the reader control apparatus 111 starts transferring the document image data read by the image sensor IS1 to the controller control apparatus 104. Next, in step S508, the reader control apparatus 111 completes reading the document image via the image sensor IS1. In step S509, the reader control apparatus 111 completes transferring the image data to the controller control apparatus 104.

Next, in step S510, the reader control apparatus 111 sends a notification that reading of the document is completed to the controller control apparatus 104. In this way, the reading process is completed.

On the other hand, in step S501, if the reader control apparatus 111 determines a document size mixed mode (YES in step S501), the operation proceeds to step S511. In this case, the reader control apparatus 111 starts processing in a document size mixed mode and in a monochrome mode.

In step S511, the reader control apparatus 111 determines whether to read the document in a two-sided reading mode, based on reading mode information sent from the controller control apparatus 104. If the reader control apparatus 111 determines that a two-sided reading mode is specified (YES in step S511), the operation proceeds to step S521. If not (NO in step S511), the operation proceeds to step S512.

Next, in step S512, the reader control apparatus 111 starts feeding the document from the automatic document feeder 112. Next, in step S513, the reader control apparatus 111 starts reading the document via the image sensor IS1. When the document detection sensor S2 detects the document trailing edge, in step S514, the reader control apparatus 111 determines the document size based on the above process. Next, in step S515, the reader control apparatus 111 notifies the controller control apparatus 104 of the determined document size.

Next, in step S516, the reader control apparatus 111 receives a read request from the controller control apparatus 104. In step S517, the reader control apparatus 111 starts transferring the read image data to the controller control apparatus 104.

Next, in step S518, the reader control apparatus 111 completes reading the one-sided document image via the image sensor IS1. In step S519, the reader control apparatus 111 completes transferring the read image data to the controller control apparatus 104. Next, in step S520, the reader control apparatus 111 sends a notification that reading of the document is completed to the controller control apparatus 104. In this way, the copying machine completes the processing.

On the other hand, in step S511, if the reader control apparatus 111 determines that the document needs to be read in a two-sided reading mode, the operation proceeds to step S521. Next, in step S521, the reader control apparatus 111 starts feeding the document from the automatic document feeder 112. Next, in step S522, the image sensor IS1 starts reading the document front-side image. In step S523, when the document detection sensor S2 detects the document trailing edge, the reader control apparatus 111 determines the document size based on the above process.

Next, in step S524, the reader control apparatus 111 notifies the controller control apparatus 104 of the determined document size.

Next, in step S525, the reader control apparatus 111 receives a read request from the controller control apparatus 104. In step S526, the reader control apparatus 111 starts transferring the read front-side image data to the controller control apparatus 104.

Next, in step S527, when the leading edge of the conveyed document reaches the image sensor IS2, the reader control apparatus 111 starts reading the document back-side image via the image sensor IS2. In step S528, the reader control apparatus 111 completes reading the front-side image via the image sensor IS1.

Next, in step S529, the reader control apparatus 111 completes transferring the document front-side image data to the controller control apparatus 104. In step S530, the reader control apparatus 111 sends a notification that reading of the document front-side is completed to the controller control apparatus 104. Next, in step S531, the reader control apparatus 111 completes reading the document back-side image via the image sensor IS2.

Next, in step S532, the reader control apparatus 111 completes transferring the document back-side image data to the controller control apparatus 104. In step S533, the reader control apparatus 111 sends a notification that reading of the document back-side image is completed to the controller control apparatus 104. In this way, the processing is completed.

According to the present exemplary embodiment, the reader control apparatus 111 can determine whether to execute a first read control or a second read control, based on the document size sent to the controller control apparatus 104 and based on a read instruction sent from the controller control apparatus 104.

More specifically, the front- and back-side image data simultaneously read by the image sensors IS1 and IS2 is stored in the first and second areas in the memory 114, respectively. In parallel with this process, in the first read control, the front- and back-side image data is read from the memory 114, and the read image data is transferred to the controller control apparatus.

The first read control is executed if the tentative document size (maximum document size) set before the document is conveyed matches a determined document size.

The front- and back-side image data simultaneously read by the image sensors IS1 and IS2 is stored in the first or second area in the memory 114. In parallel with this, in the second read control, the front- and back-side image data stored in the memory 114 is read, and the read image data is transferred to the control apparatus.

In addition, according to the present exemplary embodiment, the first read control and the second read control can be changed while the document is conveyed. Thus, even if the memory 114 does not have a capacity capable of reading a color image of a maximum document size, both sides of a document of the maximum document size can be read simultaneously.

FIGS. 12 and 13 illustrate a document read sequence in a document size mixed mode of the copying apparatus according to the present exemplary embodiment. FIGS. 12 and 13 illustrate sequences when document sizes LGL and LTR-R are determined in steps S410 and S411 in FIG. 6, respectively.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-223820 filed Oct. 1, 2010, which is hereby incorporated by reference herein in its entirety.

What is claimed is:

1. An image processing apparatus comprising:
a reader; and
a controller,
wherein the reader comprises:
a conveying unit configured to convey a plurality of documents of different sizes;
a reading unit configured to read an image of a document conveyed by the conveying unit;
a detecting unit configured to detect a size of a document conveyed by the conveying unit;
a notifying unit configured to notify the controller of a document size detected by the detecting unit; and
a transmitting unit configured to transmit a document image read by the reading unit to the controller,
wherein the controller comprises:
a setting unit configured to set an image magnification ratio in accordance with a document size notified by the notifying unit; and
a changing unit configured to change magnification of an image transmitted by the transmitting unit, in accordance with a magnification ratio set by the setting unit, and
wherein, before the detecting unit detects the document size, the notifying unit notifies the controller of a tentative document size, and when the detecting unit detects the document size, the notifying unit notifies the controller of the document size detected by the detecting unit.

2. The image processing apparatus according to claim 1, wherein the tentative document size is a maximum size readable by the reading unit.

3. The image processing apparatus according to claim 1, wherein the reading unit reads images on both sides of a document conveyed by the conveying unit.

4. A control method for controlling an image processing apparatus comprising a reader and a controller,
wherein the reader comprises:
conveying a plurality of documents of different sizes;
reading images of the conveyed documents;
detecting sizes of the conveyed documents;
notifying the controller of the detected document sizes; and
transmitting the read document images to the controller,
wherein the controller comprises:
setting an image magnification ratio in accordance with a document size notified by the reader; and
changing magnification of an image transmitted by the reader, in accordance with the set magnification ratio, and
wherein, before the document size is detected, the reader notifies the controller of a tentative document size, and when the document size is detected, the reader notifies the controller of the detected document size.

5. A non-transitory computer readable storage medium for storing a computer program for controlling an image processing apparatus including a reader and a controller,
wherein the reader comprises:
a code to read an image of a document conveyed by a conveying unit conveying a plurality of documents of different sizes;
a code to detect a size of the conveyed document;
a code to notify the controller of the detected document size; and
a code to transmit the read document image to the controller, and
wherein the controller comprises:
a code to set an image magnification ratio in accordance with a document size notified by the reader; and
a code to change magnification of an image transmitted from the reader, in accordance with the set magnification ratio, and
wherein, before the document size is detected, the reader notifies the controller of a tentative document size, and when the document size is detected, the reader notifies the controller of the detected document size.

* * * * *